United States Patent
Murai et al.

[11] Patent Number: 6,005,673
[45] Date of Patent: *Dec. 21, 1999

[54] FACSIMILE MACHINE AND FACSIMILE COMMUNICATION SYSTEM

[75] Inventors: Kazuo Murai, Tokyo; Kenichi Mizuma, Yokohama, both of Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/767,643

[22] Filed: Dec. 17, 1996

[30] Foreign Application Priority Data

Dec. 18, 1995 [JP] Japan .................................. 7-348809
Oct. 31, 1996 [JP] Japan .................................. 8-289893

[51] Int. Cl.$^6$ ..................................................... H04N 1/00
[52] U.S. Cl. ......................... 358/434; 358/435; 358/436
[58] Field of Search .................................. 358/434, 435, 358/436, 438, 500, 523

[56] References Cited

U.S. PATENT DOCUMENTS

| | | | |
|---|---|---|---|
| 5,224,180 | 6/1993 | Tadokoro | 382/61 |
| 5,485,282 | 1/1996 | Takeda | 358/435 |
| 5,684,604 | 11/1997 | Nakajima et al. | 358/434 |
| 5,699,170 | 12/1997 | Yokose et al. | 358/426 |
| 5,719,686 | 2/1998 | Sakamato et al. | 358/444 |

*Primary Examiner*—Kimberly A. Williams
*Attorney, Agent, or Firm*—Oblon, Spivak, McClelland, Maier & Neustadt, P.C.

[57] ABSTRACT

In a case where facsimile communications are executed via a communication line according to a specified communication protocol, in a machine in the receiving side, expanded functional information indicating the receiving form of the machine is stored in an expanded functional information memory, the expanded functional information stored in the expanded functional memory is returned by a control section to a machine in the transmitting side according to a request from the machine in the transmitting side, and then a facsimile message is received in the receiving form according to the expanded functional information notified from the machine in the transmitting side after a response is returned for controlling an output operation of a color printer.

43 Claims, 11 Drawing Sheets

FIG.4

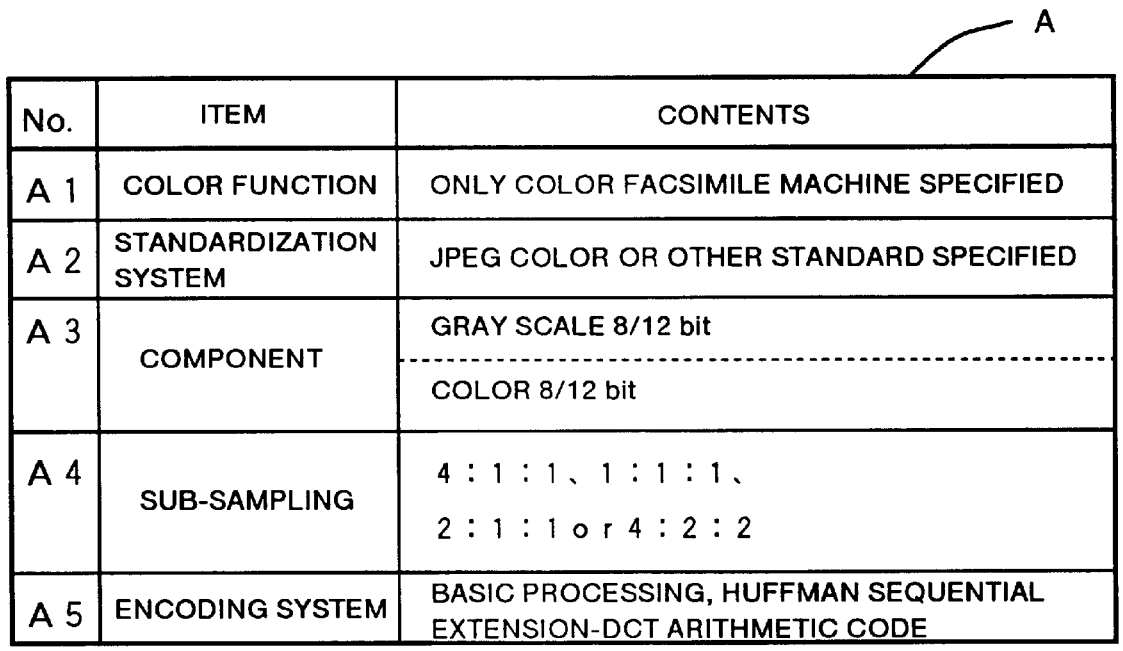

| No. | ITEM | CONTENTS |
|---|---|---|
| A 1 | COLOR FUNCTION | ONLY COLOR FACSIMILE MACHINE SPECIFIED |
| A 2 | STANDARDIZATION SYSTEM | JPEG COLOR OR OTHER STANDARD SPECIFIED |
| A 3 | COMPONENT | GRAY SCALE 8/12 bit |
| | | COLOR 8/12 bit |
| A 4 | SUB-SAMPLING | 4:1:1、1:1:1、 2:1:1 or 4:2:2 |
| A 5 | ENCODING SYSTEM | BASIC PROCESSING, HUFFMAN SEQUENTIAL EXTENSION-DCT ARITHMETIC CODE |

FIG.5

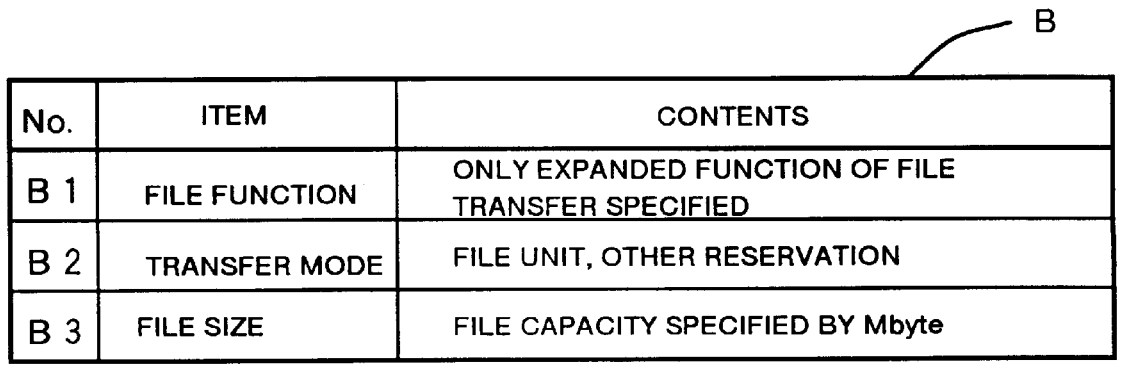

| No. | ITEM | CONTENTS |
|---|---|---|
| B 1 | FILE FUNCTION | ONLY EXPANDED FUNCTION OF FILE TRANSFER SPECIFIED |
| B 2 | TRANSFER MODE | FILE UNIT, OTHER RESERVATION |
| B 3 | FILE SIZE | FILE CAPACITY SPECIFIED BY Mbyte |

FACSIMILE MACHINE AND FACSIMILE COMMUNICATION SYSTEM

FIELD OF THE INVENTION

The present invention relates to a facsimile machine for transaction of color documents using, for instance, an expanded function in a communication protocol as well as to a facsimile communication system with the facsimile machine.

BACKGROUND OF THE INVENTION

In a color facsimile machine having a function for transaction of color documents, the color space has been standardized with L*a*b*, the compression system with JPEG (Joint Photographic Coding Experts Group) or the like, the communication protocol with, for instance, the Group 4 color extension.

In a monochrome type of facsimile machine which is used in a wide range, a received image is generally outputted at a resolution of 240 dpi or 300 dpi. In an outputted image at this resolution, the image is not degraded even if it is copied by a copying machine because the image is monochrome.

As described above, as for an image outputted by the monochrome facsimile machine, a sufficient grade of reproduction thereof can be obtained even if it is copied by a copying machine, and for this reason, when a plurality of copies of a document are required, the plurality of copies in the required grade thereof can be obtained by copying them with the copying machine, which means that it is not required to make the monochrome facsimile machine output a plurality of copies of a document.

However, in a case where an output image obtained by a color facsimile machine from image data transferred in the L*a*b* color space and an output image obtained by color-printing in three colors of Y (Yellow), M (Magenta), and C (Cyan), or in four colors of Y, M, C, and Bk (Black) which is added thereto with a color printer are copied by a copying machine, the image obtained thereby is largely degraded as compared to the monochrome image described above because there is a big difference in a gray scale expression and in a color reproduction system between the color facsimile machine or color printer and the copying machine, which causes the reproduction of the image to be degraded.

Also, in the monochrome facsimile machine described above, in a case of a machine which processes a binary image in black and white, the image is not degraded, however in a case of a machine which processes a multi-valued image in black and white, the output image is expressed in a multi-level of a gray scale (if a black and white gray scale is 8 bits, the gray scale has 256 levels), so that a degree of degradation in an image is affected according to the expression with the gray scale. For this reason, the more multiple levels the gray scale has, the more the reproducibility is degraded.

Furthermore, a data rate of color data for a color facsimile machine as well as of multi-valued data for a monochrome facsimile machine becomes substantially larger as compared to binary data for the monochrome facsimile machine, and especially, a period of time by units of a couple of minutes is required for outputting a color image per sheet in the process of forming a color image by a copying machine. For this reason, in a case where a plurality copies of a color image are outputted by the copying machine, the copying machine is occupied for a long period of time therefor.

SUMMARY OF THE INVENTION

It is an object of the present invention to provide a facsimile machine which can realize optimal facsimile communications in accordance with a receiving capability of a machine in the receiving side.

It is another object of the present invention to provide a facsimile machine which can output a color image or a multi-valued image without any degradation in the image in an output form in response to a request from a machine in the transmitting side without using a copying machine, and can reduce a period of time required for the output in the output form in response to the request from the machine in the transmitting side according to the receiving capability of the machine in the receiving side.

It is another object of the present invention to provide a facsimile communication system in which a machine in the transmitting side can realize optimal facsimile communications in accordance with the receiving capability of a machine in the receiving side.

It is still another object of the present invention to provide a facsimile communication system which can output a color image or a multi-valued image without any degradation in the image in an output form in response to a request from a machine in the transmitting side without using a copying machine, and can reduce a period of time required for the output in the output form in response to the request from the machine in the transmitting side according to the receiving capability of the machine in the receiving side.

To solve the problems described above and achieve the objects mentioned above, a facsimile machine according to the present invention transmits information indicating the receiving form for the machine with expanded functional information to a machine in the transmitting side; whereby optimal facsimile communication is realized according to a receiving capability of the machine, so that it is possible to improve practicability of the machine in the receiving side.

A facsimile machine according to the present invention transmits information indicating the receiving form including a file output form for the machine with expanded functional information to a machine in the transmitting side; whereby most suitable facsimile communication is realized by controlling a file output operation corresponding to receiving capability of the machine, so that it is possible to improve practicability of the machine in the receiving side.

A facsimile machine according to the present invention transmits information indicating the receiving form including a print output form for the machine with expanded functional information to a machine in the transmitting side; whereby optimal facsimile communications is realized by controlling a print output operation corresponding to receiving capability of the machine, so that it is possible to improve practicability of the machine in the receiving side.

A facsimile machine according to the present invention controls either one of or both a file output operation and a print output operation according to expanded functional information for a machine in the transmitting side, and stores received data from the machine in the transmitting side especially in a case where an instruction for a file output form is included in the expanded functional information for the machine in the transmitting side; whereby optimal facsimile communication is realized by controlling the file output operation and the print output operation according to the receiving capability of the machine, so that it is possible to improve practicability of the machine in the receiving side.

A facsimile machine according to the present invention transmits information indicating the receiving form including a file output form as well as a monochrome type of print output form for the machine with expanded functional information to a machine in the transmitting side, and stores received data from the machine in the transmitting side in a case where an instruction for a file output form or an instruction for a color type of print output form is included in the expanded functional information for the machine in the transmitting side; whereby optimal facsimile communication is realized by switching the color of type print output form to the file output form corresponding to receiving capability of the machine, so that it is possible to improve practicability of the machine in the receiving side.

In a facsimile machine according to the present invention, the specified communication protocol is a transfer sequence following the recommendation for ITU-T color facsimile standard, so that it is possible to effectively utilize an expanded function with a machine in the transmitting side.

In a facsimile machine according to the present invention, the expanded functional information indicating the print output form includes information concerning the number of copies to be printed and print output according to the number of copies to be printed instructed in the receiving form according to a request from the machine in the transmitting side is realized; whereby the print output is possible in a state of a color image without any image deterioration or in a state of multi-valued image without using a copying machine, and also time for outputting in the receiving form corresponding to the request from the machine in the transmitting side according to receiving capability of the machine is shortened; so that it is possible to improve practicability of the machine in the receiving side.

In a facsimile machine according to the present invention, as the expanded functional information indicating the print output form includes information concerning resolution, the print output with resolution instructed in the receiving form corresponding to a request from the machine in the transmitting side is realized; whereby the print output is provided in a state of a color image without image deterioration or in a state of multi-valued image without using a duplicator, and also time for outputting in the receiving form corresponding to a request from the machine in the transmitting side according to receiving capability of the machine is shortened; so that it is possible to improve practicability of the machine in the receiving side.

In a facsimile machine according to the present invention, the expanded functional information indicating the print output form includes information concerning a size of a print form, which realizes the print output in the size of the print form instructed in the receiving form corresponding to a request from the machine in the transmitting side; whereby print output is provided in a state of a color image without image deterioration or in a state of multi-valued image without using a duplicator, and in addition time for outputting in the receiving form corresponding to a request from the machine in the transmitting side according to the receiving capability of the machine is shortened; so that it is possible to improve practicability of the machine in the receiving side.

In a facsimile communication system according to the present invention, a machine in the transmitting side controls an output operation of a machine in the receiving side with an expanded function corresponding to a receiving function of the machine in the receiving side; whereby optimal facsimile communication is realized by the machine in the transmitting side according to the receiving capability of the machine in the receiving side, so that it is possible to improve practicability of the machine in the receiving side.

In a facsimile communication system according to the present invention, a machine in the transmitting side controls an output operation of a machine in the receiving side with an expanded function according to a receiving function of the machine in the receiving side, and at the same time controls a file output operation with expanded functional information for the machine in the transmitting side; whereby the file output operation is controlled by the machine in the transmitting side according to the receiving capability of the machine in the receiving side, and optimal facsimile communication is realized, so that it is possible to improve practicability of the machine in the receiving side.

In a facsimile communication system according to the present invention, a machine in the transmitting side controls an output operation of a machine in the receiving side with an expanded function according to the receiving function of the machine in the receiving side, and at the same time controls a print output operation with expanded functional information for the machine in the transmitting side; whereby the print output operation is controlled by the machine in the transmitting side according to the receiving capability of the machine in the receiving side, and optimal facsimile communication is realized, so that it is possible to improve practicability of the machine in the receiving side.

In a facsimile communication system according to the present invention, a machine in the transmitting side controls an output operation of a machine in the receiving side by an expanded function corresponding to a receiving function of the machine in the receiving side, and at the same time controls either one of or both a file output operation and a print output operation with expanded functional information for the machine in the transmitting side; whereby the file output operation and the print output operation are controlled by the machine in the transmitting side corresponding to receiving capability of the machine in the receiving side and optimal facsimile communication is realized, so that it is possible to improve practicability of the machine in the receiving side.

In a facsimile communication system according to the present invention, a machine in the transmitting side controls an output operation of the machine in the receiving side with expanded functional information according to a receiving form including a file output form as well as a monochrome type of a print output form for the machine in the receiving side, and also stores received data from the machine in the transmitting side in a case where an instruction for the file output form or an instruction for a color type of the print output form is included in the expanded functional information for the machine in the transmitting side; whereby the machine in the transmitting side switches the color type of the print output form to the file output form corresponding to receiving capability of the machine in the receiving side and optimal facsimile communication is realized, so that it is possible to improve practicability of the machine in the receiving side.

In a facsimile communication system according to the present invention, the expanded functional information set by a setting means includes any of or a combination of data rate such as color data/monochrome data or gradation data or data for encoding system as transmitting information; whereby in a machine in the receiving side, a facsimile message is received most effectively according to the transmitting information received from the machine in the transmitting side, so that it is possible to improve practicability of the machine in the receiving side.

In a facsimile communication system according to the present invention, the specified communication protocol is a transfer sequence following the recommendation for the ITU-T color facsimile standard, which makes it possible to effectively utilize the expanded function with the machine in the transmitting side.

In a facsimile communication system according to the present invention, the expanded functional information indicating the print output form includes information concerning the number of copies to be printed, which realizes the print output according to the number of copies to be printed instructed in the receiving form corresponding to a request from the machine in the transmitting side; whereby the print output is completed in a state of a color image without image deterioration or in a state of multi-valued image without using a duplicator, and also time for outputting in the receiving form corresponding to a request from the machine in the transmitting side according to receiving capability of the machine in the receiving side is shortened, so that it is possible to improve practicability of the machine in the receiving side.

In a facsimile communication system according to the present invention, the expanded functional information indicating the print output form includes information concerning resolution, which realizes the print output with resolution instructed in the receiving form corresponding to the request from the machine in the transmitting side; whereby the print output is provided in a state of a color image without image deterioration or in a state of multi-valued image without using a duplicator, and also time for outputting in the receiving form corresponding to a request from the machine in the transmitting side according to receiving capability of the machine in the receiving side is shortened, so that it is possible to improve practicability of the machine in the receiving side.

In a facsimile communication system according to the present invention, the expanded functional information indicating the print output form includes information concerning a size of a print form, which realizes the print output in the size of the print form instructed in the receiving form corresponding to a request from the machine in the transmitting side; whereby the print output is provided in a state of a color image without image deterioration or in a state of multi-valued image without using a duplicator, and also time for outputting in the receiving form corresponding to a request from the machine in the transmitting side according to receiving capability of the machine in the receiving side is shortened, so that it is possible to improve practicability of the machine in the receiving side.

Other objects and features of this invention will become understood from the following description with reference to the accompanying drawings.

BRIEF DESCRIPTION OF THE DRAWINGS

FIG. 4 is a view showing an example of transmitting information in expanded functional information;

FIG. 5 is a view showing an example of file information in expanded functional information;

DESCRIPTION OF THE PREFERRED EMBODIMENTS

Detailed description is made hereinafter for a preferred embodiment of the present invention with reference to the related drawings.

Figure 1:
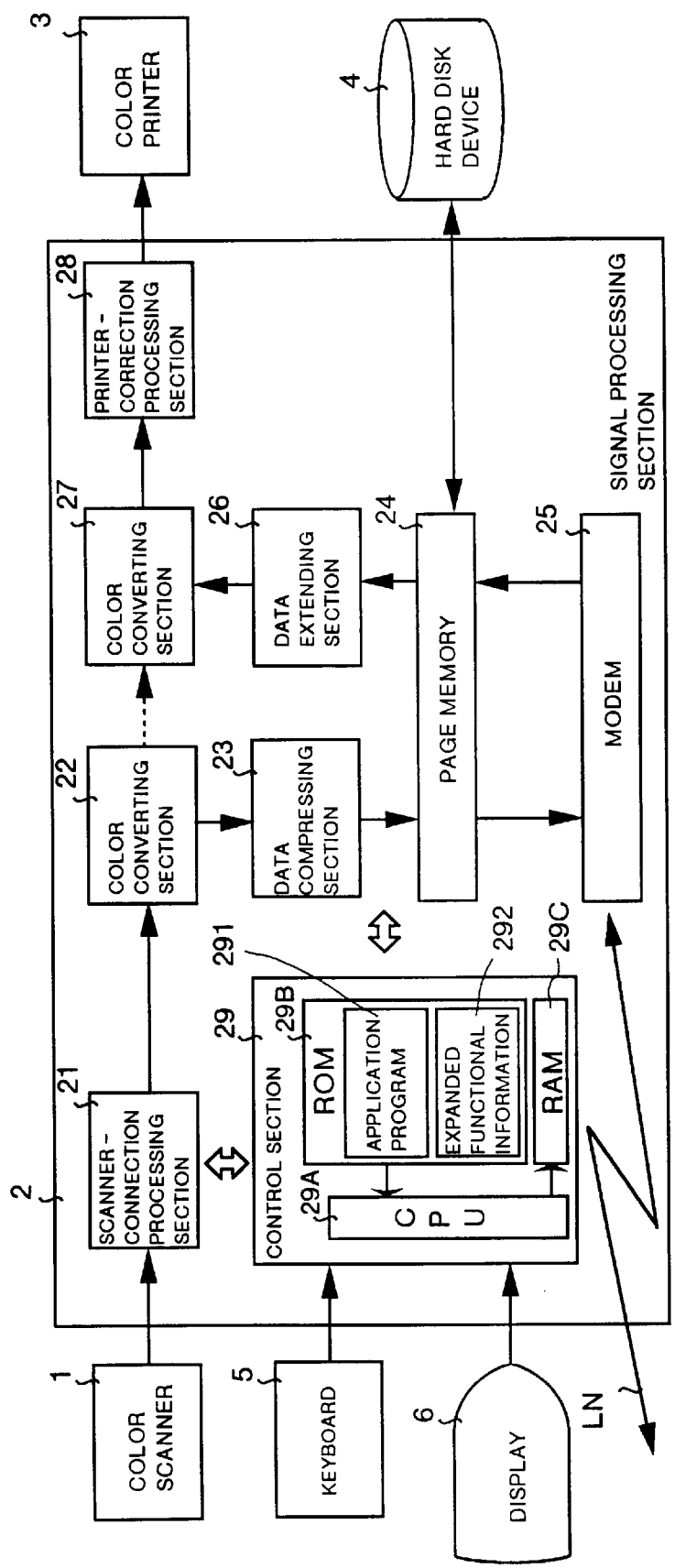
FIG. 1 is a block diagram showing internal configuration of a color type of facsimile machine according to one embodiment of the present invention.

At first, description is made for a color type of facsimile machine. FIG. 1 is a block diagram showing internal configuration of the color type of facsimile machine according to an embodiment of the present invention. The color type of facsimile machine shown in FIG. 1 executes facsimile communications following the recommendation of the ITU-T (International Telecommunication Union-Telecommunication recommendation).

This facsimile machine has an expanded function, and identifies transaction forms, when facsimile communications are to be executed, by means of transaction of transmitting information, file information, and print information before data transaction is executed with this expanded function.

The color type of facsimile machine comprises, as shown in FIG. 1, for instance, a color scanner 1, a signal processing section 2, a color printer 3, a hard disk device 4, a keyboard 5, and a display 6.

The color scanner 1 is a reader having an image pickup element with, for instance, a three-line CCD, and an A/D converter, and obtains digitalized RGB image data through the A/D converter by optically reading a color document to be transmitted with the image pickup element according to control by a control section 29 described later. It should be noted that this RGB image data is subjected to 3-line positional correction.

The signal processing section 2 is connected to the color scanner 1, color printer 3, hard disk device 4, keyboard 5, display 6, and a communication line LN or the like, and reads a color document with the scanner, executes color printing of a color image with the printer, writes data in and reads the data from the hard disk, inputs operational data, displays an operating state and communicating state on the display, controls communications or the like, and executes internal signal processing therein.

This signal processing section 2 comprises a scanner-correction processing section 21, a color converting section 22, a data compressing section 23, a page memory 24, a modem 25, a data extending section 26, a color converting section 27, a printer-correction processing section 2:3, and a control section 29.

The scanner correction-processing section 21 is connected to the color scanner 1, receives data for an RGB image therefrom, and subjects the data to scanner correction such as a gray balance, γ-correction, and an MTF (Modulation Transfer Function)-correction or the like.

The color converting section 22 is connected to the scanner-correction processing section 21, receives the data for the RGB image having been subjected to scanner correction therefrom, and subjects the data to sampling or to color conversion to the L*a*b* color space based on the color facsimile standardization system following the recommendation of the ITU-T.

The data compressing section 23 is connected to the color converting section 22, receives the data for the L*a*b* image having been subjected to color conversion therefrom, and compresses the data according to the a Rossi (JPEG) or a loss-less encoding (arithmetic code) compression system each defined in the color facsimile standardization system described above to reduce the rate of data.

In this data compressing section 23, it is required to apply only the L* element in a case where the expanded function is used for monochrome multi-valued data.

Also in the data compressing section 23, transmission data enabling transmission to a monochrome type of facsimile machine can be obtained if the data is encoded in any of MH (Modified Huffman), MR (Modified READ), or MMR (Modified MR) systems after the code is converted to binary code or after a half-tone in a gray scale is processed according to an error diffusion method or the like.

The page memory 24 is connected to the data compressing section 23, receives the compressed image data therefrom, and stores the data as transmission data. This page memory 24 stores transmission data in an operation for transmission, and stores received data in an operation for receiving, taking into considerations a communication time or recovery of any error.

Also the page memory 24 is connected to the hard disk device 4, writes data in the compressed state and reads the data according to control by the control section 29.

The modem 25 is a unit for communication control connected to the communication line LN for modulating or demodulating transmitted/received data in response to transaction. Namely, this modem 25 is connected to the page memory 24, receives transmission data therefrom, modulates the data to transmit it to the communication line LN, and demodulates the data received from the communication line LN to output the data to the page memory 24. It should be noted that the demodulated data is data for L*a*b* image.

The data extending section 26 is connected to the page memory 24, receives the modulated L*a*b* image data (received data or data read from the hard disk device 4) therefrom, and expands the data in the Rossi-system or the loss-less coding system according to the compressing system of the data to return the data to the original rate of data.

The color converting section 27 is connected to the data extending section 26, executes sub-sampling of the extended L*a*b* image data therefrom, and also converts the L*a*b* color space to color image data in a YMC system or a YMCBk system each appropriate to color materials for the color printer 3.

The printer-correction processing section 28 is connected to the color converting section 27, receives color image data therefrom, and subjects the data to gray balance among Y, M, C, γ-correction, gray scale processing, processing for changing an image size (conversion of resolution) to output the data to the color printer 3.

The control section 29 is a unit for controlling the entire signal processing section 2 and comprises a CPU 29A, a ROM 29B, a RAM 29C (which corresponds to a first storing means according to the present invention) or the like. The CPU 29A is a section for executing controlling operations in the control unit 29 according to various types of control programs each stored in the ROM 29B.

This control section 29 provides control operations, when a facsimile message is to be transmitted, so that the expanded functional information defined in the communication protocol is set and the information is reported transmitted) to a facsimile machine as a machine in the receiving side, and also provides controls, when a facsimile message is to be received, so that expanded functional information for the machine is given back to the machine in the transmitting side in response to the demand from the facsimile machine as a machine in the transmitting side and an output operation is controlled according to the expanded functional information for the machine.

The ROM 29B comprises an application program memory 291 storing therein an application program, and an expanded functional information memory 292 storing therein expanded functional information indicating a receiving form of the machine which is applied to communication protocol following the recommendation of ITU-T or the like. The application program includes a program for transmission according to the flow chart shown in FIG. 9 and a program for receiving according to each of the flow charts shown in FIG. 10 and FIG. 11.

The RAM 29C is used as a work area when the CPU 29A is operated, and is also used as a memory for storing therein expanded functional information to report a transmission form to a machine in the receiving side which is used for facsimile communications.

The color printer 3 is connected to the printer-correction processing section 28 in the signal processing section 2, receives the color image data having been subjected to printer correction therefrom, and prints a color image on a sheet of recording paper according to this color image data. This color printer 3 employs any of such recording methods as ink-jet printing, a sublimation type of thermal transfer printing, electro-photography, and printing with silver chloride or the like.

The hard disk device 4 is an external storage device with a large capacity connected to the page memory 24 for data transaction therewith according to control by the control section 29 to write the data in and read the data from the hard disk.

The keyboard 5 is an operation unit comprising keys for executing facsimile communications including therein input of expanded functional information to supply the key-entry information to the control section 29.

The display 6 comprises a display unit with an LCD or a CRT for forming a display screen for displaying thereon various functions and a state of communications each concerning facsimile communications and for executing the expanded function according to control by the control section 29.

It should be noted that the color type of facsimile machine described above mainly executes facsimile communications and also operates as a color copying machine because the data compressing section 23 between the color converting section 22 and color converting section 27, page memory 24, modem 25, and data extending section 26 are passed through in a case where the color scanner 1, scanner-correction processing section 21, color converting section 22, color converting section 27, printer 28, and color printer 3 are used for a processing system.

Figure 2:
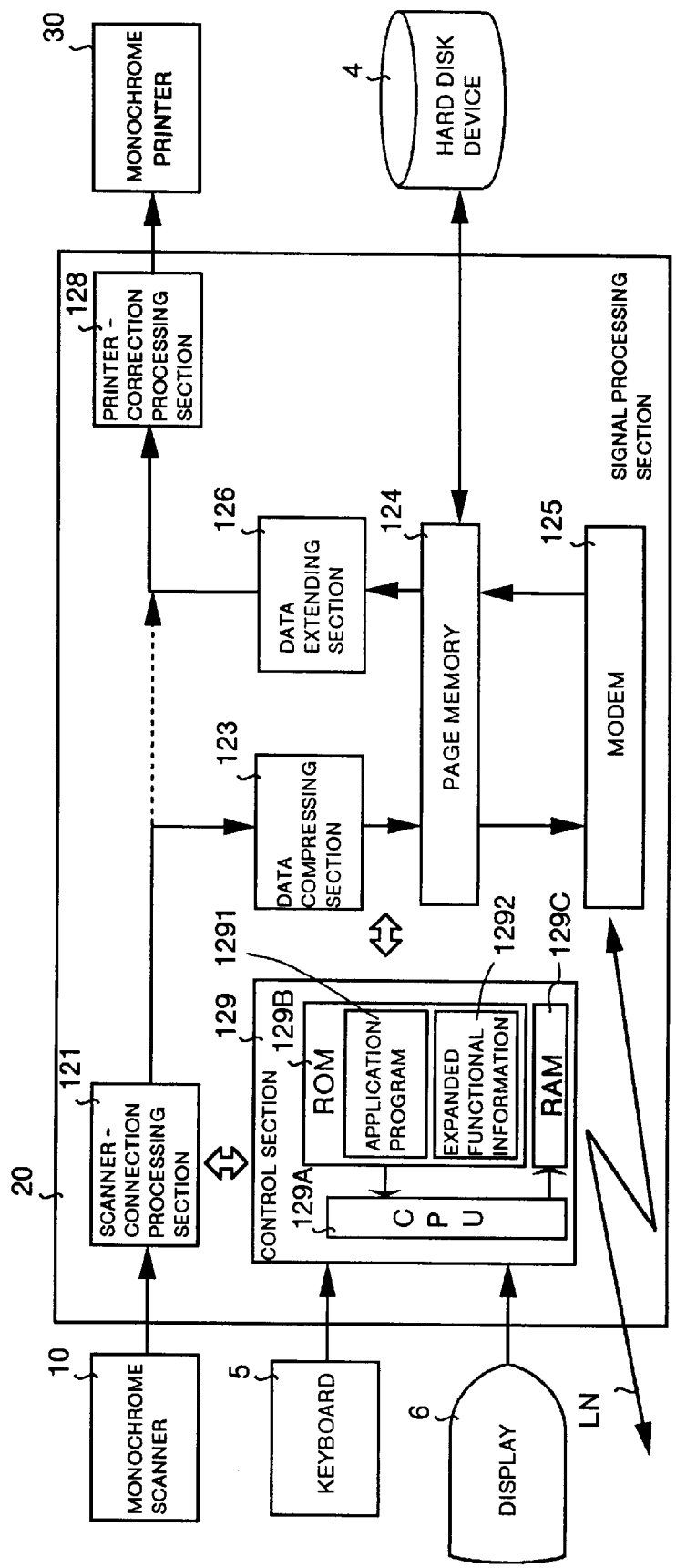
FIG. 2 is a block diagram showing internal configuration of a monochrome type of facsimile machine according to one embodiment of the present invention.

Next, a description is made for the monochrome type of facsimile machine. FIG. 2 is a block diagram showing internal configuration of the monochrome type of facsimile machine according to an embodiment of the present invention. The monochrome type of facsimile machine shown in FIG. 2 executes facsimile communications according to recommendations of ITU-T as in the color type of facsimile machine described above.

This facsimile machine has a expanded function like that in the color type of facsimile machine, and recognizes transaction forms, when facsimile communications is to be executed, by means of transaction of transmitting information, file information, and print information before data transaction is executed with this expanded function.

In the monochrome type of facsimile machine shown in FIG. 2, the same reference numerals are assigned to the sections corresponding to those in the color type of facsimile machine shown in FIG. 1, and description thereof is omitted herein. Description is made hereinafter for a monochrome scanner 10, a signal processing section 20, and a monochrome printer 30 each different from that in the color type of facsimile machine.

The monochrome scanner 10 is a reader having an image pickup element with, for instance, a CCD, and an A/D converter, and obtains digitalized multi-valued image data through the A/D converter by optically reading a monochrome document to be transmitted with the image pickup element according to control by a control section 129.

The signal processing section 20 is connected to the monochrome scanner 10, monochrome printer 30, hard disk device 4, keyboard 5, display 6, and a communication line LN or the like, and reads a monochrome document with the scanner, executes monochrome printing of a monochrome image with the printer, writes data in and reads the data from the hard disk, enables input of operational data through the keyboard, displays an operating state and communicating state on the display, controls communications or the like, and executes internal signal processing therein.

This signal processing section 20 comprises such units as a scanner-correction processing section 121, a data compressing section 123, a page memory 124, a modem 125, a data extending section 126, a printer-correction processing section 128, and a control section 129. This signal processing section 20 has no units corresponding to the color converting sections 22 and 27 because it is not the color type one, and each of the units is operated as the monochrome type one, and for this reason, the functions and operations therein are the same as those in the signal processing section 2, so that description thereof is omitted herein.

The control section 129 is a unit for controlling the entire signal processing section 20 and comprises a CPU 129A, a ROM 129B, a RAM 129C or the like. The CPU 123A is a section for executing controlling operation in the control unit 129 according to various types of control programs each stored in the ROM 129B.

This control section 129 provides controls, when a facsimile message is to be transmitted as a monochrome type of facsimile, so that the expanded functional information defined in the communication protocol is set and the information is reported (transmitted) to a facsimile machine as a machine in the receiving side, and also provides controls, when a facsimile message is to be received as a monochrome type of facsimile, so that expanded functional information for the machine is given back to the machine in the transmitting side in response to the demand from the facsimile machine as a machine in the transmitting side and an output operation is controlled according to the expanded functional information for the machine.

An application program memory 1291 and an expanded functional information memory 1292 each provided in the ROM 129B have no difference in memory contents from those in the color type except the point that the machines functions as a monochrome type facsimile machine.

Herein, detailed description is made for the expanded functional information. This expanded functional information is handled in the same manner in the color type as well as in the monochrome type, so that description is made for the color type of facsimile machine shown in FIG. 1 as an example.

Figure 3:
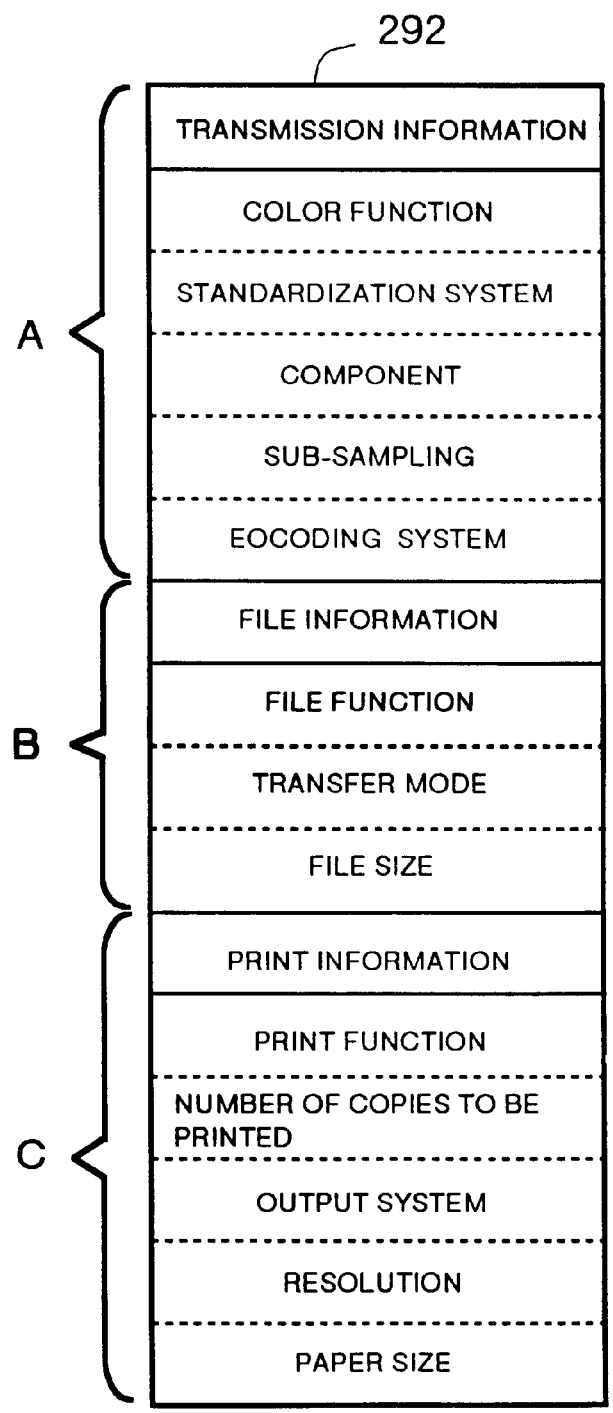
FIG. 3 is a view showing an example of memory configuration of an expanded functional information memory according to this embodiment.
Figure 6:
FIG. 6 is a view showing an example of print information in expanded functional information.

FIG. 3 is a view showing an example of a memory structure in the expanded functional information memory 292 according to the embodiment of the present invention, FIG. 4 is a view showing an example of transmitting information in the expanded functional information, FIG. 5 is a view showing an example of file information in the expanded functional information, and FIG. 6 is a view showing an example of print information in the expanded functional information.

Stored in the expanded functional information memory 292 is expanded functional information as expanded parameters item by item in a form of classifying the contents in each of the items. More specifically, the expanded functional information memory 292 comprises, as shown in FIG. 3, transmitting information A, file information B, and print information C.

A facsimile machine which is used as a machine in the transmitting side specifies each of the expanded functional information according to the classification in the expanded functional information stored in the expanded functional information memory 292, and notifies a machine in the receiving side of the specified information. At this point of time, the expanded functional information is set on the RAM 29C.

The transmitting information A comprises data for a color function, a standardization system, component, sub-sampling, and an encoding system or the like. The file information B comprises data for a filing function, a transfer mode, a file size or the like. The print information C comprises data for a printing function, the number of copies to be printed, an output system, resolution, and a paper size or the like.

In the transmitting information A (Refer to FIG. 4), the color function A1 is data for specifying only a color facsimile machine, and the standardization system A2 is data for specifying JPEG color or other standard.

The component A3 is data indicating a gray scale for gray scale expression and a data rate for color data, the sub-sampling A4 is data indicating sub-sampling for reproduction of original signals with high fidelity, and the encoding system A5 is data for specifying basic processing and Huffman sequential extension-DCT (Discrete Cosine Transform) arithmetic code.

In the file information B (Refer to FIG. 5), the filing function B1 is data for specifying only an expanded function of file transfer, and the transfer mode B2 is data for specifying a file unit and other reservation, and the file size B3 is data for specifying a file capacity by Mbyte.

In the print information C (Refer to FIG. 6), the printing function C1 is data specified when the color printing function is expanded, and the number of copies to be printed C2 is data for specifying the number of copies in a range from 0 to 255 copies. The output system C3 is data for specifying an output system among electro-photography, ink-jet, sublimation type, and silver chloride, the resolution C4 is data for specifying one of the resolution among 300, 400, 600, and 1200 dpi, and the paper size C5 is data for specifying a paper size among A3, B4, A4, B5, A5, B6, A6, DLT, LG, LT, and HLT.

Figure 7:
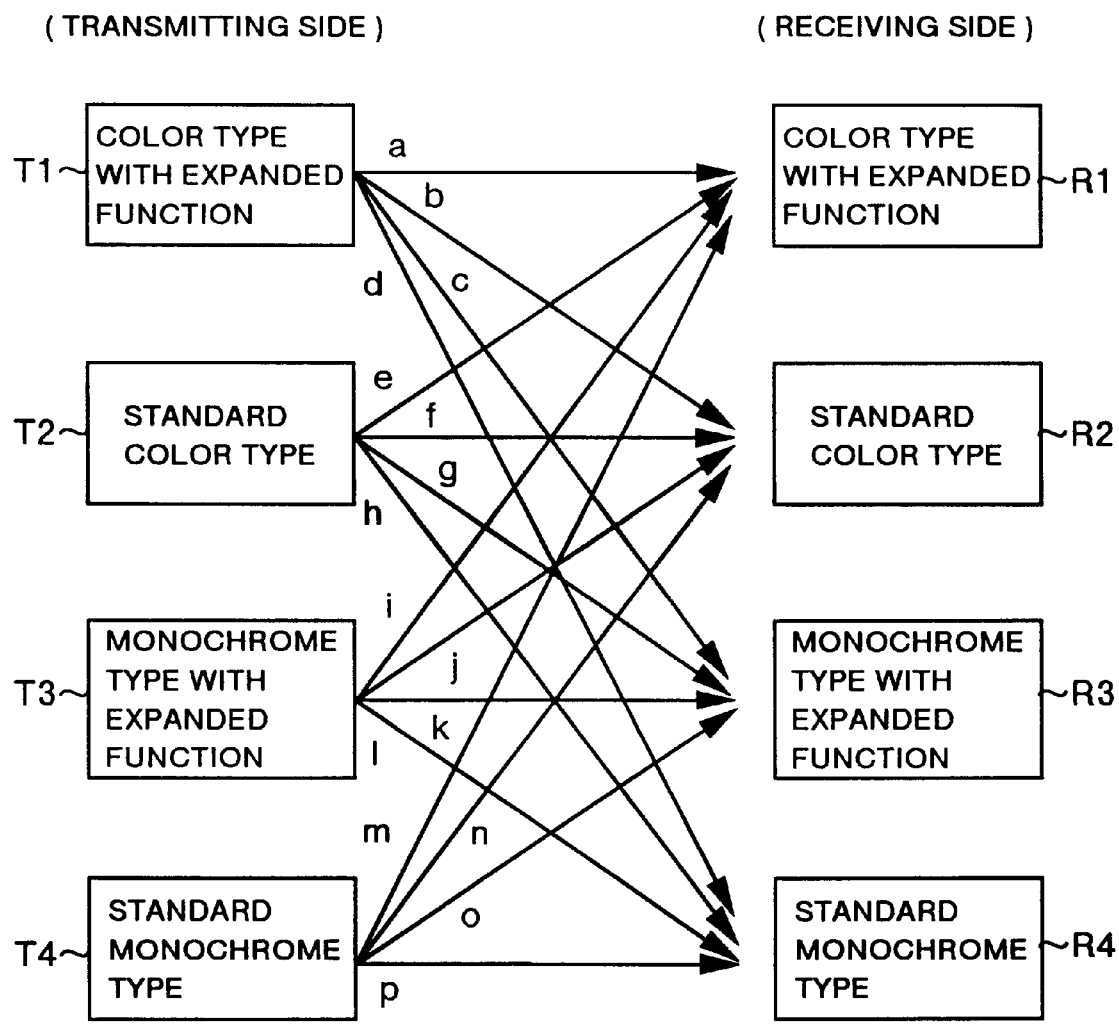
FIG. 7 is a view showing an example of combinations for sending and receiving types according to this embodiment.

Next, a description is made for a facsimile communication system according to the present invention. FIG. 7 is a view showing an example of combinations of each of types in a transmitting side and each of types in a receiving side in the embodiment.

In FIG. 7, the facsimile machines in the transmitting side are indicated with the reference numerals T1, T2, T3, and T4 in the order of a color type with an expanded function, a standard color type, a monochrome type with an expanded function, and a standard monochrome type, and the facsimile machines in the receiving side are indicated with the reference numerals R1, R2, R3, and R4 in the same order.

The components constituting the color type of facsimile machine shown in FIG. 1 are the color type of facsimile machines T1, R1 with an expanded function, and the standard color type of facsimile machine T2, and the component constituting the monochrome type of facsimile machine shown in FIG. 2 is the monochrome type of facsimile machine R3 with an expanded function.

The types of the facsimile machine are: divided into four types, as described above, of the color type one with an expanded function, standard color type one, monochrome type one with an expanded function, and standard monochrome type one. In a case where facsimile communication is executed among these four types of the machine, as shown in FIG. 7, 16 types of combination of the machines indicated with (a) to (p) can be made between machines in the transmitting side and those in the receiving side.

The expanded function can be executed in four types of combination among these 16 types thereof. The four combinations are as follows: (a) the color type (facsimile machine T1) with an expanded function—the color type (facsimile machine R1) with an expanded function, (c) the color type (facsimile machine T1) with an expanded function—the monochrome type (facsimile machine R3) with an expanded function, (e) the standard color type (facsimile machine T2)—the color type (facsimile machine R1) with an expanded function, and (g) the standard color type (facsimile machine T2)—the monochrome type (facsimile machine R3) with an expanded function.

As for an output form according to a facsimile function, in the combination (a), print output with specification of the number of copies (the large number of copies are possible) which is a print output form and color filing (stored in the hard disk) which is a file output form are possible.

In other combinations (c), (e), and (g), color filing is possible, and especially in a case where a machine in the receiving side is the monochrome type one with an expanded function, color printing can not be executed although the data can be received as color data, so that, if the received data is color-filed once, color printing can be executed afterward with any of electronic equipment enabling color output.

In this case, in the monochrome type of facsimile machine R3 with an expanded function, a floppy disk unit or an output terminal may be provided therein so that the data can be outputted to external devices in a state of color data.

Among the 12 types of combination excluding the four combinations described above, in the combinations of (b) and (f), a facsimile function as a standard color type can be obtained, and in other types of combinations (10 types), a facsimile function as a standard monochrome type can be obtained.

Figure 8:
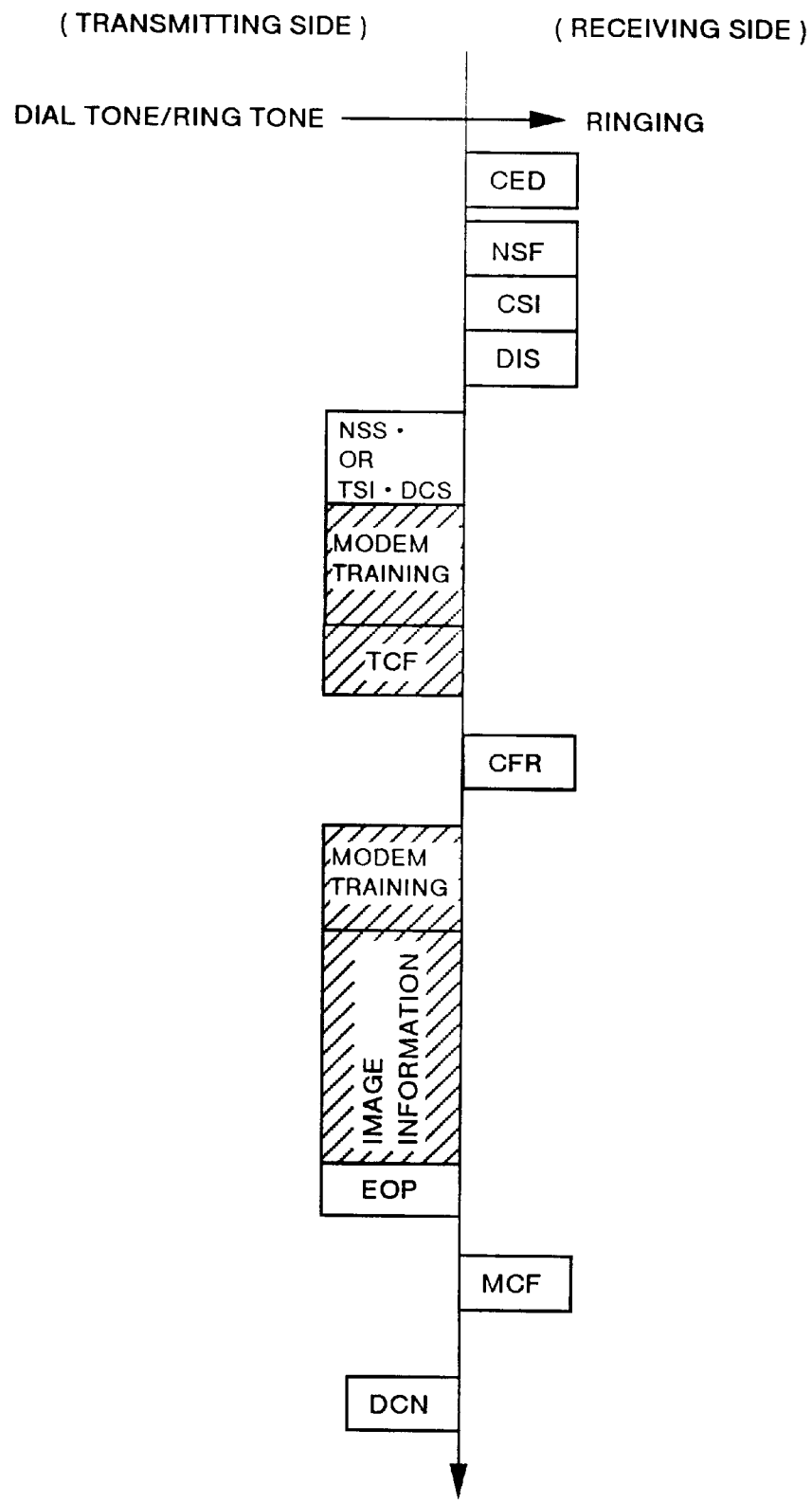
FIG. 8 is a view showing an example of protocol according to this embodiment.

Next, a description is made for a transfer sequence. FIG. 8 is a view showing an example of a communication protocol according to the embodiment.

The communication protocol shown in FIG. 8 is employed for the facsimile communication in this embodiment. Each of controls described below is used for this communication protocol: CED (Called Station Identification), NSF (Non-Standard Facilities), CSI (Called Station Identification), DIS (Digital Identification Signal), NSS (Non-standard Facilities Set-up), TSI (Transmitting Station Identification), DCS (Digital Command Signal), TCF (Training Check Field), CFR (Confirmation to Receive), EOP (End of Procedure), and MCF (Message Confirmation).

When a machine in the transmitting side issues a dial tone and a ring tone to a machine in the receiving side, the machine in the receiving side generates ringing. Then, the machine in the receiving side issues signals of CED, NSF, CSI, and DIS as control signals to the machine in the transmitting side. This operation is executed at a point of time when receiving is started.

The CED reports the fact that the machine in the receiving side is ready for receiving to the machine in the transmitting side. In a case where the machine in the receiving side is a type with an expanded function, the NSF is used as an effective control signal. This NSF reports expanded functional information for the machine (indicating, in this case, data stored in the expanded functional information memory 292) to the machine in the transmitting side. Also the CSI reports the ID number (telephone number or the like) of the machine to the machine in the transmitting side, the DIS reports functions of the machine according to the recommendation for standards according to the Group 3 specification.

Then, the machine in the transmitting side issues the NSS or TSI·DCS to the machine in the receiving side, and further sends the TCF thereto after modem training is executed. This operation is executed at a point of time when transmission is started.

The NSS reports expanded functional information indicating a transmitting form in which transmission is executed (indicating, in this case, data stored in the RAM 29C set based on both of the expanded functional information for the machine in the receiving side as well as for the machine) to the machine in the receiving side. The TSI reports the ID number (telephone number or the like) of the machine to the machine in the receiving side, the DCS reports functions of the machine according to the standard recommendation according to the Group 3 specification.

Then the modem training is executed, and quality of the communication line LN is checked by the TCF before image information (color data or monochrome data) is transmitted.

The machine in the receiving side issues the CFR to the machine in the transmitting side during this checking of the modem, and the CFR reports the fact that the modem training was successful to the machine in the transmitting side.

As described above, when the modem training is finished, the machine in the transmitting side issues the image information to the machine in the receiving side, and the fact that transmission of the last page of the image information is ended is reported to the machine in the receiving side by sending the EOP.

After this operation, the machine in the receiving side issues the MCF to the machine in the transmitting side, and the MCF reports the fact that the machine normally received the image information to the machine in the transmitting side.

Finally, the machine in the transmitting side issues a signal of DCN to the machine in the receiving side, and the DCN reports the fact that the communication line LN is switched from the facsimile communication to telephone communication thereto.

Figure 9:
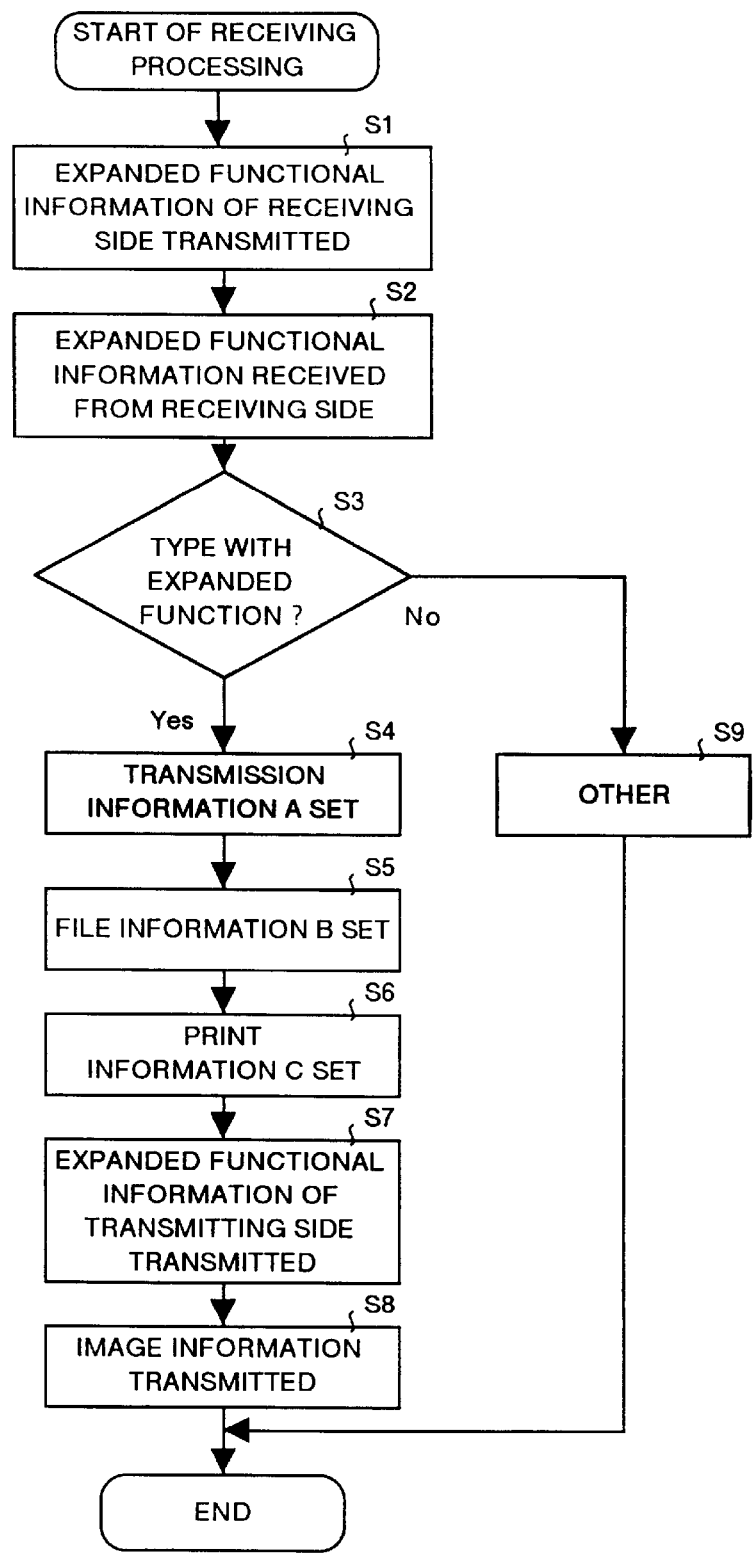
FIG. 9 is a flow chart explaining a sending operation according to this embodiment.

Next, a description is made for transmitting operation. FIG. 9 is a flow chart for explanation of the transmitting operation in the embodiment. In this flow chart, facsimile transmitting operations by a machine in the transmitting side (the color type of facsimile machine T1 with an expanded function or the standard color type of facsimile machine T2) are described as an example.

At first, in step S1, a machine in the transmitting side requests expanded functional information to a machine in the receiving side (e.g. any one of the facsimile machines R1 to R4), and executes processing for receiving a response (expanded functional information or the like) from the machine in the receiving side in step S2. The response at this point of time, namely the received data is temporarily stored in the RAM 29C.

Then, in step S3, the machine in the transmitting side executes processing for making determination as to whether the machine in the receiving side is a type with an expanded function (a color type with an expanded function or a monochrome type with an expanded function) or a standard type (a standard color type or a standard monochrome type).

In this step S3, the determination as to whether the machine in the receiving side is a type with an expanded function or not is made according to a filing function B1 in the file information B as well as to a printing function C1 in the print information C. Then in a case where it is determined that the machine is a type with an expanded function, the processing is shifted to step S4, and on the other hand, in a case where it is determined that the machine is a standard type, the processing is shifted to other processing in step S9, then the processing is ended.

In step S4, transmitting information A is set. In a case of this transmitting information A, if the machine in the receiving side is also a type with an expanded function and satisfies the set contents in the transmitting information A for the machine in the transmitting side, a color function A1, a standard system A2, a component A3, sub-sampling A4, and an encoding system A5 are defined in the specified set contents. It should be noted that the color function A1 in this transmitting information A is specified as a color type because the machine in the transmitting side is a color type.

Then in step S5, file information B is set. In a case of this file information B, if the machine in the receiving side is also a type with an expanded function and satisfies the set contents in the transmitting information B for the machine in the transmitting side, a file function B1, a transfer mode B2, and a file size B3 are defined in the specified set contents. It should be noted that, in a case where this file information B does not give an instruction for color filing to the machine in the receiving side, it is not required to define the file function B1. Namely, a file output form is not instructed thereto.

Then in step S6, file information C is set. In a case of this file information C, if the machine in the receiving side is also a type with an expanded function and satisfies the set contents in the transmitting information C for the machine in the transmitting side, a print function C1, the number of copies to be printed C2, an output system C3, resolution C4, and a paper size C5 are defined in the specified set contents. It should be noted that, in a case where this file information C does not give an instruction for color output to the machine in the receiving side, it is not required to define the print function C1. Namely, a print output form is not instructed thereto.

Then, in step S7, the expanded functional information set by the machine in the transmitting side in steps S4, S5, S6 are transmitted with the NSS control signal in the communication protocol in a case where the machine in the transmitting side is a color type with an expanded function, or are transmitted with the DCS control signal in the communication protocol in a case where the machine in the transmitting side is a standard color type.

After this step S7, transmission of image information (color data) is executed according to the communication protocol in step S8, and the transmission processing is finished.

Figure 10:
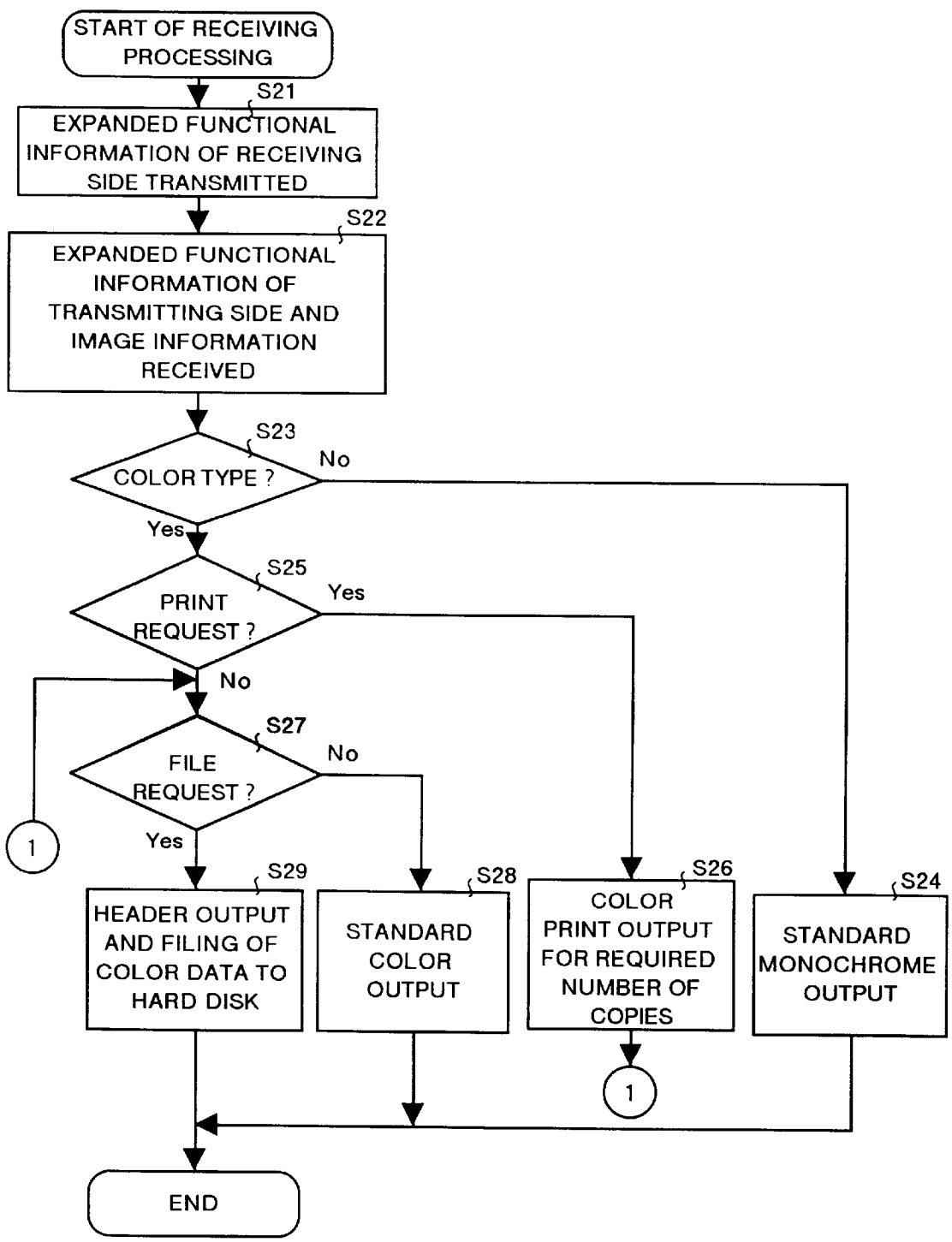
FIG. 10 is a flow chart explaining an example of a receiving operation according to this embodiment.

Next, a description is made for the receiving operation. Operations of the color type of facsimile machine R1 with an expanded function receiving a facsimile message from the color type of facsimile machine T1 with an expanded function or from the standard color type of facsimile machine T2 is described as an example. FIG. 10 is a flow chart for explanation of an example of the receiving operation in this embodiment.

At first, the facsimile machine R1 reads, in step S21, the transmitting information A, file information B, and print information C each stored in the expanded functional information memory 292 in response to a request from a machine in the transmitting side to return (to transmit) the read information to the machine in the transmitting side.

In this case, the information is transmitted with the NSF control signal in the communication protocol because the machine in the receiving side is a color type with an expanded function. It should be noted that the standard type of facsimile machine R2 as well as of facsimile machine R4 do not return information with the NSF control signal, but return a standard function of the machines with the DIS control signal because both of the machines can not execute, when executing operations as machines in the receiving side, any expanded function instructed by the machine in the transmitting side with an expanded function.

Then, in step S22, the machine in the receiving side executes processing for receiving expanded functional information as well as image information each sent from the machine in the transmitting side. The transmission of these information described above are executed in steps S7 and S8 (Refer to FIG. 9) in the transmission processing in the machine in the transmitting side. It should be noted that the expanded functional information as well as images information are temporarily stored in the RAM 29C.

More specifically, expanded functional information is received by means of the NSS control signal in the communication protocol in a case where the machine in the transmitting side is a color type with an expanded function, or expanded functional information is received by means of the DCS control signal in the communication protocol in a case where the machine in the transmitting side is a standard color type. The expanded functional information received as described above is temporarily stored in the RAM 29C.

Then, the processing is shifted to step S23, and the machine in the receiving side deciphers the transmitting information A stored in the RAM 29C and makes determination from the contents set in the color function A1 as to whether the machine in the transmitting side is a color type or a monochrome one.

Then, in a case where it is determined that the machine in the transmitting side is a color type one, the processing is shifted to step S25, on the other hand, in a case where it is determined that the machine in the transmitting side is a monochrome type one, the processing is shifted to step S24, and the machine in the receiving side controls the color printer 3 so that the printer outputs a monochrome print corresponding to the standard monochrome type. After this step S24, the receiving processing is finished.

Then, in a case where the processing is shifted to step S25, the machine in the receiving side further deciphers the print information C stored in the RAM 29C, and makes determination from the set contents in the print function C1 as to whether a color print output is requested, namely there is a print request with the expanded function or not. Then if it is determined that there is the print request, the processing is shifted to step S26.

In this step S26, the required number of copies to be printed is identified from the set contents for the number of copies to be printed C2 in the print information C, and the color printer 3 is controlled so that color print output will be executed by the identified number of copies to be printed. After the step S26, the processing is shifted to step S27.

In a case where it is determined that there is no print request in step S24 described above, the processing is shifted to step S27, and the machine in the receiving side deciphers the file information B stored in the RAM 29C and makes determination from the contents set in the filing function B1 as to whether color filing is requested or not, namely whether a filing request with the expanded function has been issued or not.

Then, in a case where it is determined chat there has been issued a filing request, the processing is shifted to step S29 to execute color filing. On the other hand, in a case where it is determined that there has not been issued a filing request, determination is made that instruction for the expanded function has not been issued from the machine in the transmitting side, so that the processing is shifted to step S28 and the machine in the receiving side controls the color printer 3 so that the printer outputs a color print corresponding to the normal standard color type. After the steps S28 and S29, the receiving processing is terminated.

It should be noted that either one of or both of a request for printing and a request for filing in the expanded function can be specified by the machine in the transmitting side. For this reason, in the flow chart shown in FIG. 10, color filing can also be executed in step S29 in a case where the request for filing can be identified in step S27 after color printing is operated in step S26.

In step S29, the color printer 3 is controlled so that a header page is printed in color or in monochrome to report to a user for the machine in the receiving side whether the color filing was normally operated or not.

Also, in a case where the processing is shifted up to step S28 after the color printing is executed in step S26, it indicates that the expanded function for the print function has already been selected, and for this reason, the receiving processing is terminated as it is with color printing according to the standard color type not executed in step S28.

In the step S26 described above, other items, namely an output system C3, resolution C4, size of paper C5, are also identified according to the print information C stored in the RAM 29C.

As for the output system C, the color printer 3 in the machine in the receiving side is allowable so long as it is any one of the types among electro-photography, ink-jet, sublimation type, and silver chloride as shown in FIG. 6, but sometimes the resolution C4 and the size of paper C5 may not match those required from the machine in the transmitting side. In this case, the problems may be solved by employing any of the following five methods from (1) to (5) described below;

Namely, the five methods are:
(1) executing print output by changing the print output form to the resolution and the size of paper provided in the machine in the receiving side;
(2) stopping print output to a sheet of recording paper;
(3) having the hard disk device 4 automatically operated with a message for notifying transmission by facsimile communication and executing color filing to the hard disk;
(4) printing out a portion of the received document by a color type or by a monochrome type according to received image information, having the hard disk device 4 automatically operated with the message for facsimile communications, and executing color filing to the hard disk; and
(5) executing monochrome print output by changing the print output form to that for the monochrome type. These methods may be specified so as to enable execution of facsimile communications before start of or at the point of the operations.

It is preferable for the operations to provide, for instance, a switch in the machine, and in this case, either a hard switch or a soft switch may be employed.

Then, if the operating state is reported to the machine in the transmitting side, the transmitter can identify the result of the transmission.

In a case where there is not enough memory space for color-filing the received image information in the hard disk when color filing is executed according to the specification of the file function B1, it is desirable to stop the transmission before reception of the image information. Accordingly, determination may be made as to whether the reception is possible or not by deciphering the transmitting information A, file information B, and print information C in a stage in which expanded functional information is received (before reception of image information), and if it is determined that the reception is not possible, it is possible to stop operation of the machine in the transmitting side by generating a pseudo state indicating an error or the like.

In step S29, output of the header page may be unified to a monochrome print regardless of whether the received image information is color data or monochrome data. If the image information for the header page is color data, only the L* element in the L*a*b* color space may be converted to monochrome data to execute printing, so that the printing can be simplified.

As for a print request in step S25 and a file request in step S27, the order of the processing in the steps may be interchanged so that the file request is identified before the print request.

In this case, determination concerning the print request in step S25 is executed after the color filing is executed in step S29, and if the print request is issued, color print output is executed in step S26, while if the print request is not issued, print output is executed by the standard color type. Also, in step S27, the processing is followed by the print request in step S25 regardless of whether there is the file request or not.

Also, in a case where the order of the processing for the print request is interchanged to that for the file request as described above, image information may be received when the processing is executed in discrete output form (steps S24, S26, S28, S29). Even if the print request is issued after the color filing is executed, color print can be outputted by reading data from the hard disk.

Figure 11:
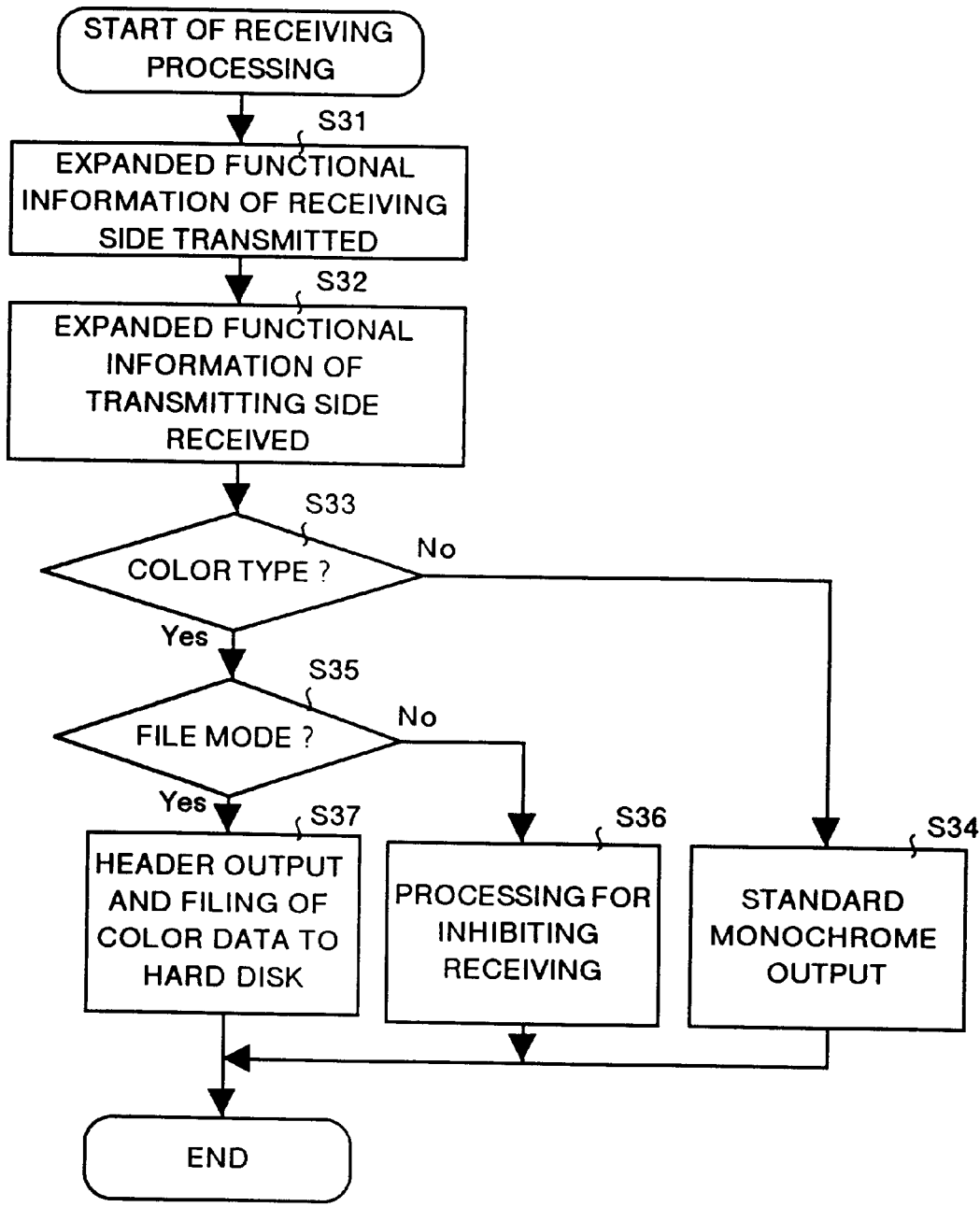
FIG. 11 is a flow chart explaining other example of a receiving operation according to this embodiment.

Next, description is made for operations of the monochrome type of facsimile machine R3 with an expanded function for receiving facsimile messages from the color type of facsimile machine T1 with an expanded function or the standard color type of facsimile machine T2. FIG. 11 is a flow chart for explaining an other case of receiving operation in the embodiment.

The facsimile machine R3, at first, in step S31, reads the transmitting information A, file information B, and print information C each stored in the expanded functional information memory 292 in response to a request from a machine in the transmitting side and returns (transmits) the information to the machine in the transmitting side. In this case, the expanded functional information is transmitted by means of the NSF control signal in the communication protocol because the machine in the receiving side is a monochrome type with an expanded function.

Then, in step S32, an operation for receiving the expanded functional information sent from the machine in the transmitting side is executed. This operation is executed in step S7 (Refer to FIG. 9) of the transmitting processing in the machine in the transmitting side. It should be noted that the expanded functional information is temporarily stored in the RAM 29C like the case of the facsimile machine R1.

Then, the processing is shifted to step S33, the transmitting information A stored in the RAM 29C is deciphered, and determination is made as to whether the machine in the transmitting side is a color type one or a monochrome type one from the contents set in the color function A1.

In a case where it is determined that the machine is a color type one, the processing is shifted to step S35. On the other hand, in a case where it is determined that the machine is a monochrome type one, the processing is shifted to step S34, and the machine in the receiving side controls the monochrome printer 30 so that monochrome print is outputted according to the standard monochrome type while image information is received. After this step S34, the receiving processing is terminated.

Then, in a case where the processing is shifted to step S35, the machine in the receiving side further deciphers the file information B stored in the RAM 29C, and makes determination from the set contents in the file function B1 as to whether a color filing has been requested, namely whether a filing request with the expanded function has been issued or not. As described above, the machine in the receiving side does not identify the set contents in the print function C1 in this sequence of processing because a print function in the machine in the receiving side is a monochrome type one.

Then, in a case where it is determined that there has been issued a filing request, the processing is shifted to step S37 to execute header output and color filing while receiving the image information. On the other hand, in a case where it is determined that there has not been issued a filing request, determination is made that instruction for the expanded function has not been issued from the machine in the transmitting side, so that the processing is shifted to step S36 and the machine in the receiving side executes processing for inhibiting reception. After this operation, the processing for receiving is terminated.

It should be noted that, in step S37, the monochrome printer 30 is controlled so that the header page is printed in monochrome to report to a user for the machine in the receiving side whether the color filing was normally operated or not.

Figure 12A:
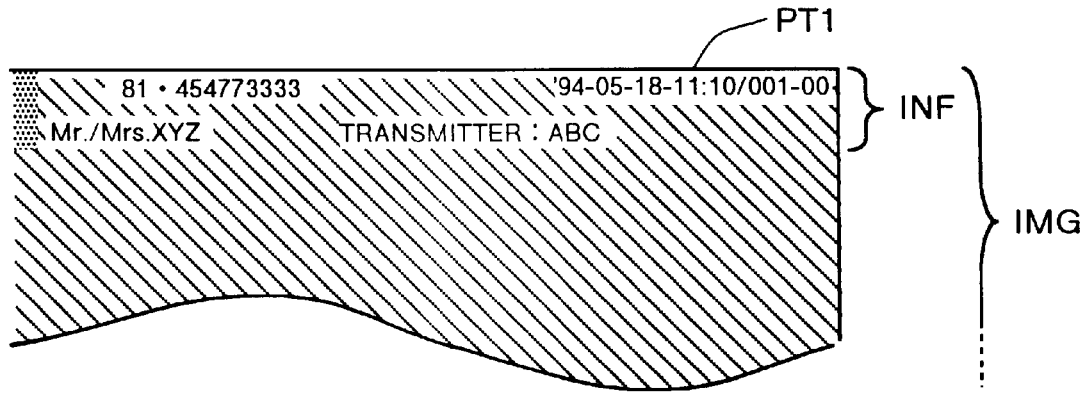
FIGS. 12A to 12C are views showing an example of print according to a variant of this embodiment.
Figure 12B:
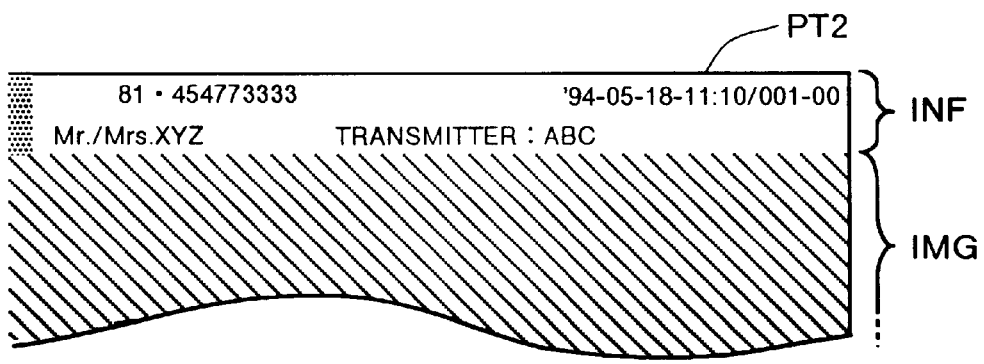
Figure 12C:
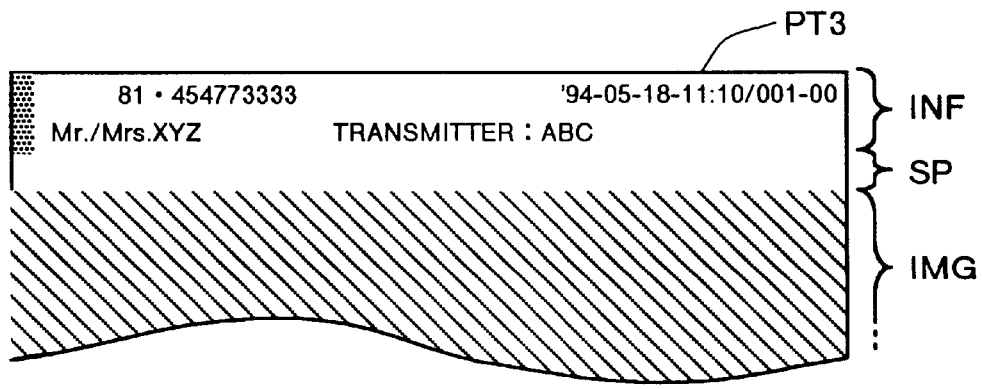

Next, a description is made for a modification in the step S29 as well as in the step S37 each described above. FIGS. 12A to 12C are views showing an example of printing in the modification according to the embodiment.

In print output of the header page according to this modification, as shown in FIG. 12A, FIG. 12B, and FIG. 12C, for instance, three types of printing methods are prepared so that any one of them can be selected in actual use. Prints PT1, PT2, PT3 shown in FIG. 12A, FIG. 12B, FIG. 12C, respectively show a system in which a transmitter-record inserting section INF is commonly printed at the edge section of a page.

Included in the transmitter-record inserting section INF is information concerning an ID (a telephone number of the transmitter or the like), a transmitted date, a filing number, a destination, a transmitter (a name of the company, a name of the section, a personal name or the live) or some other information.

There is employed a system in print PT1 in which an image IMG of image information for a header page is superimposed on the transmitter-record inserting section INF. This system is effective in a case where the header page is printed so as not to lose the image thereof.

Employed in print PT2 is a system in which a portion of an image IMG of image information for a header page superimposed on the transmitter-record inserting section INF is removed therefrom. This system is effective in a case where the information for the transmitter-record inserting section INF is clearly and independently provided.

Employed in print PT3 is a system in which a portion of an image IMG of image information for a header page superimposed on the transmitter-record inserting section INF is removed therefrom and a space SP is provided so that there is a certain distance between the transmitter-record inserting section INF and the image IMG. This system is effective in a case where the information for the transmitter-record inserting section INF is further more clearly and independently provided than the case of print PT2.

As described above, with the embodiment, a color type of facsimile machine with an expanded function of or one with the standard function in the transmitting side controls an output operation from a machine in the receciving side by means of the expanded function corresponding to the receiving function of the machine in the receiving side with an expanded function, so that the machine in the transmitting side can realize optimal facsimile communications in accordance with a receiving capability of the machine in the receiving side. As a result, it is possible to improve practicability of the machine in the receiving side.

Especially, either of or both of a file output operation and a print output operation is controlled by (expanded functional information for the machine in the transmitting side, so that the machine in the transmitting side can control a file output operation and a print output operation in accordance with a receiving capability of the machine in the receiving side.

Also, a color type of facsimile machine with an expanded function or one with the standard in the transmitting side controls an output operation from a machine in the receiving side by means of the expanded functional information corresponding to a receiving form including therein a file output form (color filing) as well as a print output form (monochrome print output) of a monochrome type of machine in the receiving side with an expanded function, and at the same time, the machine in the receiving side stores the data (color data) received from the machine in the transmitting side in the hard disk in a case where an instruction for a file output form or that for a color type of print output form are included in the expanded functional information for the machine in the transmitting side, so that the machine in the transmitting side can replace a color type of print output form with a file output form in accordance with the receiving capability of the machine in the receiving side.

Furthermore, the machine in the transmitting side can make the machine in the receiving side execute color filing as required according to an output form of the machine in the receiving side, namely to monochrome print output without demanding color print to a monochrome type of facsimile machine with an expanded function, which make it possible to select the most preferable output form within the performance of the machine in the receiving side.

Included in the expanded functional information set by the machine in the transmitting side is, as transfer data A, any one of or a combination of a color function A1 specifying color data/monochrome data, a component A3 specifying data rate of gray scale data, and an encoding system A5 specifying data for an encoding system, so that the machine in the receiving side can realize optimal reception of a facsimiles message according to transmitting information received from the machine in the transmitting side as required.

A communication protocol is set to a transfer sequence following the recommendation for the ITU-T color facsimile standard, so that expanded function can effectively be used between machines in the transmitting side as well as in the receiving side.

Also, information concerning the number of copies to be printed is included in expanded functional information indicating a print output form, so that it is possible to realize print output according to the number of copies specified by the receiving form in response to a request from the machine in the transmitting side. As a result, it is possible to improve practicability of a machine in the receiving side because an output in a state of a color image or a multi-valued image with no image degradation is completed without any help by a copying machine, or because a period of time required for the output can be reduced with a receiving form corresponding to a request from the machine in the transmitting side according to the receiving capability of the machine in the receiving side.

Furthermore, different from a case where an image that has once been printed on a piece of paper is again copied, it is possible to obtain output of an image close to that of the original document image set in the machine in the transmitting side in terms of a gray scale and reproduced colors.

Also, information concerning resolution is included in the expanded functional information indicating the print output form, so that it is possible to realize a print output with the resolution specified according to the receiving form corresponding to a request from the machine in the transmitting side.

Also, information concerning size of a print form is included in the expanded functional information indicating the print output form, so that it is possible to realize a print output with size of a paper form specified according to the receiving form corresponding to a request from the machine in the transmitting side.

As explained above, with the facsimile machine according to the present invention, information indicating a receiving form for the machine is transmitted with expanded functional information to a machine in the transmitting side; whereby optimal facsimile communication is realized according to the receiving capability of the machine, so that it is possible to obtain a facsimile machine enabling to improve practicability of a machine in the receiving side.

With the facsimile machine according to the present invention, information indicating a receiving form including a file output form for the machine is transmitted with expanded functional information to a machine in the transmitting side; whereby optimal facsimile communication is realized by controlling a file output operation according to the receiving capability of the machine, so that it is possible to obtain a facsimile machine enabling to improve practicability of a machine in the receiving side.

With the facsimile machine according to the present invention, information indicating a receiving form including a print output form for the machine is transmitted with expanded functional information to a machine in the transmitting side; whereby optimal facsimile communication is realized by controlling a print output operation according to the receiving capability of the machine, so that it is possible to obtain a facsimile machine enabling to improve practicability of a machine in the receiving side.

With the facsimile machine according to the present invention, either one of or both a file output operation and a print output operation are controlled according to expanded functional information for a machine in the transmitting side, and received data from the machine in the transmitting side is stored especially in a case where an instruction for a file output form is included in the expanded functional information for the machine in the transmitting side; whereby optimal facsimile communication is realized by controlling the file output operation and the print output operation according to the receiving capability of the machine, so that it is possible to obtain a facsimile machine enabling to improve practicability of a machine in the receiving side.

With the facsimile machine according to the present invention, information indicating a receiving form including a file output form as well as a monochrome type of print output form for the machine is transmitted with expanded functional information to a machine in the transmitting side, and the received data from the machine in the transmitting side is stored in a case where an instruction for a file output form or an instruction for a color type of print output form is included in the expanded functional information for the machine in the transmitting side; whereby optimal facsimile communication is realized by switching the color type of print form to the file output form according to the receiving capability of the machine, so that it is possible to obtain a facsimile machine enabling to improve practicability of a machine in the receiving side.

With the facsimile machine according to the present invention, the specified communication protocol is a transfer sequence following the recommendation for ITU-T color facsimile standard, so that it is possible to obtain a facsimile machine enabling to effectively utilize an expanded function with a machine in the transmitting side.

With the facsimile machine according to the present invention, the expanded functional information indicating the print output form includes information concerning the number of copies to be printed, which realizes the print output according to the number of copies to be printed instructed in the receiving form corresponding to a request from the machine in the transmitting side, whereby the print output is provided in a state of a color image without image deterioration or in a state of multi-valued image without using a duplicator, and also time for outputting in the receiving form corresponding to a request from the machine in the transmitting side according to the receiving capability of the machine is shortened, so that it is possible to obtain a facsimile machine enabling to improve practicability of a machine in the receiving side.

With the facsimile machine according to the present invention, the expanded functional information indicating the print output form includes information concerning resolution, which realizes the print output with resolution instructed in the receiving form corresponding to a request from the machine in the transmitting side; whereby the print output is provided in a state of a color image without image deterioration or in a state of multi-valued image without using a duplicator, and also time for outputting in the receiving form corresponding to the request from the machine in the transmitting side according to receiving capability of the machine is shortened, so that it is possible to obtain a facsimile machine enabling to improve practicability of a machine in the receiving side.

With the facsimile machine according to the present invention, the expanded functional information indicating the print output form includes information concerning a size of a print form, which realizes the print output in the size of the print form instructed in the receiving form corresponding to a request from the machine in the transmitting side; whereby the print output is provided in a state of a color image without image deterioration or in a state of multi-valued image without using a duplicator, and also time for outputting in the receiving form corresponding to the request from the machine in the transmitting side according to the receiving capability of the machine is shortened, so that it is possible to obtain a facsimile machine enabling to improve practicability of a machine in the receiving side.

With the facsimile machine according to the present invention, the machine in the transmitting side controls the output operation of the machine in the receiving side with the expanded function according to a receiving function of the machine in the receiving side; whereby optimal facsimile communication is realized by the machine in the transmitting side corresponding to the receiving capability of the machine in the receiving side, so that it is possible to obtain a facsimile communication system enabling to improve practicability of a machine in the receiving side.

With the facsimile machine according to the present invention, the machine in the transmitting side controls the output operation of the machine in the receiving side with the expanded function according to the receiving function of the machine in the receiving side, and also controls the file output operation with expanded functional information for the machine in the transmitting side; whereby the file output operation is controlled by the machine in the transmitting side corresponding to the receiving capability of the machine in the receiving side, and optimal facsimile communication is realized, so that it is possible to obtain a facsimile communication system enabling to improve practicability of a machine in the receiving side.

With the facsimile machine according to the present invention, the machine in the transmitting side controls the output operation of the machine in the receiving side with the expanded function according to a receiving function of the machine in the receiving side, and also controls the print output operation with expanded functional information for the machine in the transmitting side; whereby the print output operation is controlled by the machine in the transmitting side according to the receiving capability of the machine in the receiving side, and optimal facsimile communication is realized, so that it is possible to obtain a facsimile communication system enabling to improve practicability of a machine in the receiving side.

With the facsimile machine according to the present invention, the machine in the transmitting side controls the output operation of the machine in the receiving side with the expanded function according to the receiving function of the machine in the receiving side, and also controls either one of or both the file output operation and the print output operation with expanded functional information for the machine in the transmitting side; whereby the file output operation and the print output operation are controlled by the machine in the transmitting side according to the receiving capability of the machine in the receiving side, and optimal facsimile communication is realized, so that it is possible to obtain a facsimile communication system enabling to improve practicability of a machine in the receiving side.

With the facsimile machine according to the present invention, the machine in the transmitting side controls the output operation of the machine in the receiving side with expanded functional information according to the receiving form including a file output form as well as a monochrome type of a print output form for the machine in the receiving side, and also stores received data from the machine in the transmitting side in a case where an instruction for the file output form or an instruction for a color type of the print output form is included in the expanded functional information for the machine in the transmitting side; whereby the machine in the transmitting side switches the color type of the print form to the file output form corresponding to receiving capability of the machine, and optimal facsimile communication is realized, so that it is possible to obtain a facsimile communication system enabling to improve practicability of the machine in the receiving side.

With the facsimile machine according to the present invention, the expanded functional information set by a setting means includes any of or a combination of data rate such as color data/monochrome data or gradation data or data for encoding system as transmitting information; whereby in a machine in the receiving side, a facsimile message is received most effectively according to the transmitting information received from the machine in the transmitting side, so that it is possible to obtain a facsimile communication system enabling to improve practicability of a machine in the receiving side.

With the facsimile machine according to the present invention, the specified communication protocol is a transfer sequence following the recommendation for the ITU-T color facsimile standard, which makes it possible to obtain a facsimile communication system enabling to effectively utilize the expanded function with the machine in the transmitting side.

In the facsimile machine according to the present invention, the expanded functional information indicating the print output form includes information concerning the number of copies to be printed, which realizes the print output according to the number of copies to be printed instructed in the receiving form corresponding to a request from the machine in the transmitting side; whereby the print output is provided in a state of a color image without image deterioration or in a state of multi-valued image without using a duplicator, and also time for outputting in the receiving form corresponding to a request from the machine in the transmitting side according to receiving capability of the machine in the receiving side is shortened, so that it is possible to obtain a facsimile communication system enabling to improve practicability of a machine in the receiving side.

With the facsimile machine according to the present invention, the expanded functional information indicating the print output form includes information concerning resolution, which realizes the print output with resolution instructed in the receiving form corresponding to a request from the machine in the transmitting side; whereby the print output is provided in a state of a color image without image deterioration or in a state of multi-valued image without using a duplicator, and also time for outputting in the receiving form corresponding to a request from the machine in the transmitting side according to receiving capability of the machine in the receiving side is shortened, so that it is possible to obtain a facsimile communication system enabling to improve practicability of a machine in the receiving side.

With the facsimile machine according to the present invention, the expanded functional information indicating the print output form includes information concerning a size of a print form, which realizes the print output in the size of the print form instructed in the receiving form corresponding to the request from the machine in the transmitting side; whereby the print output is provided in a state of a color image which does not have image deterioration or in a state of multi-valued image without using a duplicator, and also time for outputting in the receiving form corresponding to the request from the machine in the transmitting side according to receiving capability of the machine in the receiving side is shortened, so that it is possible to obtain a facsimile communication system enabling to improve practicability of a machine in the receiving side.

This application is based on Japanese patent applications No. HEI 7-348809 and No. HEI 8-289893 filed in the Japanese Patent Office on Dec. 18, 1995 and Oct. 31, 1996, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A facsimile machine executing facsimile communication according to a specified communication protocol comprising:
    an expanded function storing means for storing therein expanded functional information indicating a receiving form of the machine, the expanded functional information including transmitting information including data of a color function, file information including data of a file size, and print information including data of a number of copies to be printed;
    a transmitting means for transmitting, prior to receiving a facsimile message according to said specified communication protocol, the expanded functional information stored in said expanded function storing means to a machine in the transmitting side transmitting the facsimile message according to the specified communication protocol; and
    an output control means for receiving the facsimile message in a receiving form based on the expanded functional information stored in said expanded function storing means in response to the transmission of the expanded functional information from said transmitting means, and for controlling an output operation.

2. A facsimile machine according to claim 1; wherein said specified communication protocol is a transfer sequence following the recommendation for ITU-T color facsimile standard.

3. A facsimile machine executing facsimile communication according to a specified communication protocol comprising:
    an expanded function storing means for storing therein expanded functional information indicating a receiving form including a file output form from the machine, the expanded functional information including transmitting information including data of a color function, file information including data of a file size, and print information including data of a number of copies to be printed;
    a data storing means for storing therein received data;
    a transmitting means for transmitting, prior to receiving a facsimile message according to said specified communication protocol, the expanded functional information stored in said expanded function storing means to a machine in the transmitting side transmitting the facsimile message according to the specified communication protocol; and
    an output control means for receiving the facsimile message in a receiving form based on the expanded functional information demanded from the machine in the transmitting side in response to the transmission of the expanded functional information from said transmitting means, and for controlling an output operation; wherein said output control means stores data received from said machine in the transmitting side in said data storing means when a file output form is indicated with the file information of the expanded functional information for said machine in the transmitting side.

4. A facsimile machine according to claim 3; wherein said specified communication protocol is a transfer sequence following the recommendation for ITU-T color facsimile standard.

5. A facsimile machine executing facsimile communication according to a specified communication protocol comprising:
    an expanded function storing means for storing therein expanded functional information indicating a receiving form including a print output form for the machine, the expanded functional information including transmitting information including data of a color function, file information including data of a file size, and print information including data of a number of copies to be printed;
    a transmitting means for transmitting, prior to receiving a facsimile message according to said specified communication protocol, the expanded functional information stored in said expanded function storing means to a machine in the transmitting side transmitting the facsimile message according to the specified communication protocol; and
    an output control means for receiving the facsimile message in a receiving form based on the expanded functional information demanded from the machine in the transmitting side in response to the transmission of the expanded functional informatiorn from said transmitting means, and for controlling an output operation; wherein said output control means controls a print output operation when a print output form is indicated by the print information of the expanded functional information for the machine in the transmitting side.

6. A facsimile machine according to claim 5; wherein said specified communication protocol is a transfer sequence following the recommendation for ITU-T color facsimile standard.

7. A facsimile device according to claim 5; wherein the expanded functional information indicating said print output form includes information concerning the number of copies to be printed.

8. A facsimile machine according to any of claim 5; wherein the expanded functional information indicating said print output form includes information concerning resolution.

9. A facsimile machine according to claim 5; wherein the expanded functional information indicating said print output form includes information concerning a size of a print form.

10. A facsimile machine executing facsimile communication according to a specified communication protocol comprising:

an expanded functional information storing means for storing therein expanded functional information indicating a receiving form including a file output form as well as a print output form for the machine, the expanded functional information including transmitting information including data of a color function, file information including data of a file size, and print information including data of a number of copies to be printed;

a data storing means for storing therein received data;

a transmitting means for transmitting the expanded functional information stored in said expanded functional information storing means, prior to receiving a facsimile message according to said specified communication protocol, to the machine in the transmitting side transmitting the facsimile message according to the specified communication protocol; and an output control means for receiving the facsimile message in a receiving form based on the expanded functional information requested from the machine in the transmitting side in response to the transmission of the expanded functional information from said transmitting means, and for controlling an output operation; wherein said output control means controls either one of or both a file output operation and a print output operation in a case where either one of or both a file output form and a print output form are specified by the file information and the print information of the expanded functional information for said machine in the transmitting side, and stores received data from said machine in the transmitting side in said data storing means in a case where an instruction for a file output form is included in the file information of the expanded functional information for said machine in the transmitting side.

11. A facsimile machine according to claim 10; wherein said specified communication protocol is a transfer sequence following the recommendation for ITU-T color facsimile standard.

12. A facsimile device according to claim 10; wherein the expanded functional information indicating said print output form includes information concerning the number of copies to be printed.

13. A facsimile machine according to any of claim 10; wherein the expanded functional information indicating said print output form includes information concerning resolution.

14. A facsimile machine according to claim 10; wherein the expanded functional information indicating said print output form includes information concerning a size of a print form.

15. A facsimile machine executing facsimile communication according to a specified communication protocol comprising:

an expanded functional information storing means for storing therein expanded functional information indicating a receiving form including a print output form as well as a monochrome type of print output form for the machine, the expanded functional information including transmitting information including data of a color function, file information including data of a file size, and print information including data of a number of copies to be printed;

a data storing means for storing therein received data;

a transmitting means for transmitting the expanded functional information stored in said expanded functional information storing means, prior to receiving a facsimile message according to the specified communication protocol, to the machine in the transmitting side transmitting the facsimile message according to the communication protocol; and an output control means for receiving the facsimile message in a receiving form based on the expanded functional information requested from the machine in the transmitting side in response to the transmission of the expanded functional information from said transmitting means and controlling the output operation; wherein said output control means stores received data from said machine in the transmitting side in said data storing means in a case where an instruction for a file output form or an instruction for a color type print output form is included in the file information and the print information of the expanded functional information for the machine in the transmitting side.

16. A facsimile machine according to claim 15; wherein said specified communication protocol is a transfer sequence following the recommendation for ITU-T color facsimile standard.

17. A facsimile device according to claim 15; wherein the expanded functional information indicating said print output form includes information concerning the number of copies to be printed.

18. A facsimile machine according to any of claim 15; wherein the expanded functional information indicating said print output form includes information concerning resolution.

19. A facsimile machine according to claim 15; wherein the expanded functional information indicating said print output form includes information concerning a size of a print form.

20. A facsimile communication system comprising:

a machine in a transmitting side connected to a communication line and executing facsimile transmission according to a specified communication protocol; and a machine in a receiving side connected to said communication line and receiving a facsimile message according to said specified communication protocol via said communication line from said machine in the transmitting side; wherein said machine in the transmitting side comprises:

a first storing means for storing therein expanded functional information indicating a receiving form of the machine, the expanded functional information including transmitting information including data of a color function, file information including data of a file size, and print information including data of a number of copies to be printed;

a setting means for requesting transmission of the expanded functional information to said machine in the receiving side and setting the expanded functional information prior to when facsimile transmission is executed based on the expanded functional information for said machine in the receiving side as a response to the request above and the expanded functional information stored in said first storing means; and a transmission control means for reporting the expanded functional information set by said setting means to said machine in the receiving side and controlling said facsimile transmission, and said machine in the receiving side comprises:
- a second storing means for storing therein expanded functional information indicating a transmitting form of the machine;
- a responding means for returning the expanded functional information stored in said second storing means to said machine in the transmitting side according to a request from said machine in the transmitting side; and
- an output control means for receiving a facsimile message in a receiving form based on the expanded functional information reported from said machine in the transmitting side after a response is returned from said responding means and controlling the output operation.

21. A facsimile communication system according to claim 20; wherein the expanded functional information set by said setting means includes any of or a combination of a data rate of color data/monochrome data or gradation data or data for encoding system.

22. A facsimile communication system according to claim 20; wherein said specified communication protocol is a transfer sequence following recommendation for the ITU-T color facsimile standard.

23. A facsimile communication system comprising:
- a machine in a transmitting side connected to a communication line and executing facsimile transmission according to a specified communication protocol; and
- a machine in a receiving side connected to said communication line and receiving a facsimile message according to said specified communication protocol via said communication line from said machine in the transmitting side; wherein said machine in the transmitting side comprises:
  - a first storing means for storing therein expanded functional information indicating a transmitting form of the machine, the expanded functional information including transmitting information including data of a color function, file information including data of a file size, and print information including data of a number of copies to be printed;
  - a setting means for requesting transmission of the expanded functional information to said machine in the receiving side and setting the expanded functional information prior to when facsimile transmission is executed based on expanded functional information for said machine in the receiving side as a response to the request above and the expanded functional information stored in said first storing means; and
  - a transmission control means for reporting the expanded functional information set by said setting means to said machine in the receiving side and controlling said facsimile transmission, and said machine in the receiving side comprises:
- a second storing means for storing therein expanded functional information indicating a receiving form including a file output form for the machine;
- a data storing means for storing therein received data;
- a responding means for returning the expanded functional information stored in said second storing means to said machine in the transmitting side in response to a request from said machine in the transmitting side; and
- an output control means for receiving a facsimile message in a receiving form based on the expanded functional information reported from said machine in the transmitting side after a response is returned from said responding means and controlling the output operation, and wherein said output control means stores therein received data from said machine in the transmitting side in said data storing means in a case where a file output form is instructed by the file information of the expanded functional information for said machine in the transmitting side.

24. A facsimile communication system according to claim 23; wherein the expanded functional information set by said setting means includes any of or a combination of a data rate of color data/monochrome data or gradation data or data for encoding system.

25. A facsimile communication system according to claim 23; wherein said specified communication protocol is a transfer sequence following recommendation for the ITU-T color facsimile standard.

26. A facsimile communication system comprising:
- a machine in a transmitting side connected to a communication line and executing facsimile transmission according to a specified communication protocol; and
- a machine in a receiving side connected to said communication line and receiving a facsimile message according to said specified communication protocol via said communication line from said machine in the transmitting side; wherein said machine in the transmitting side comprises:
  - a first storing means for storing therein expanded functional information indicating a transmitting form of the machine, the expanded functional information including transmitting information including data of a color function, file information including data of a file size, and print information including data of a number of copies to be printed;
  - a setting means for requesting transmission of the expanded functional information to said machine in the receiving side and setting the expanded functional information prior to facsimile transmission is executed based on the expanded functional information for said machine in the receiving side as a response to the request above and the expanded functional information stored in said first storing means; and
  - a transmission control means for reporting the expanded functional information set by said setting means to said machine in the receiving side and controlling said facsimile transmission, and said machine in the receiving side comprises:
    - a second storing means for storing therein expanded functional information indicating a receiving form including a print output form for the machine;
    - a responding means for returning the expanded functional information stored in the second storing means to said machine in the transmitting side in a response to a request from said machine in the transmitting side; and
    - an output control means for receiving a facsimile message in a receiving form based on expanded functional information reported from said machine in the transmitting side after said responding means returns a response and controlling the output operation; and wherein said output control means controls a print output operation in a case where a print output form is instructed by the print information of the expanded functional information for said machine in the transmitting side.

27. A facsimile communication system according to claim 26; wherein the expanded functional information set by said setting means includes any of or a combination of a data rate of color data/monochrome data or gradation data or data for encoding system.

28. A facsimile communication system according to claim 26; wherein said specified communication protocol is a transfer sequence following recommendation for the ITU-T color facsimile standard.

29. A facsimile communication system according to claim 26; wherein the expanded function information indicating said print output form includes information for the number of copies to be printed.

30. A facsimile communication system according to claim 26; wherein the expanded functional information indicating a print output form includes information concerning resolution.

31. A facsimile communication system according to claim 26; wherein the expanded functional information indicating a print output form includes information concerning a size of a print form.

32. A facsimile communication system comprising:
   a machine in a transmitting side connected to a communication line and executing facsimile transmission according to a specified communication protocol; and
   a machine in a receiving side connected to said communication line and receiving a facsimile message according to said specified communication protocol via said communication line from said machine in the transmitting side; wherein said machine in the transmitting side comprises:
      a first storing means for storing therein expanded functional information indicating a transmitting form of the machine, the expanded functional information including transmitting information including data of a color function, file information including data of a file size, and print information including data of a number of copies to be printed;
      a setting means for requesting transmission of the expanded functional information to said machine in the receiving side and setting the expanded functional information prior to when facsimile transmission is executed based on the expanded functional information for said machine in the receiving side as a response to the request above and the expanded functional information stored in said first storing means; and
      a transmission control means for reporting the expanded functional information set by said setting means to said machine in the receiving side and controlling said facsimile transmission, and
   said machine in the receiving side comprises:
      a second storing means for storing expanded functional information indicating a receiving form including a file output form as well as a print output form for the machine;
      a data storing means for storing received data;
      a responding means for returning the expanded functional information stored in said second storing means to said machine in the transmitting side in response to a request from said machine in the transmitting side; and
      an output control means for receiving a facsimile message in a receiving form based on the expanded functional information reported from said machine in the transmitting side after a response is returned by said responding means and controlling the output operation; and also wherein said output control means controls either one of or both a file output operation and a print output form in a case where either one of or both a file output form and a print output form are instructed by the file information and the print information of the expanded functional information for said machine in the transmitting side and also stores received data from said machine in the transmitting side in said data storing means in a case where an instruction for a file output form is included in the expanded functional information for said machine in the transmitting side.

33. A facsimile communication system according to claim 32; wherein the expanded functional information set by said setting means includes any of or a combination of a data rate of color data/monochrome data or gradation data or data for encoding system.

34. A facsimile communication system according to claim 32; wherein said specified communication protocol is a transfer sequence following recommendation for the ITU-T color facsimile standard.

35. A facsimile communication system according to claim 32; wherein the expanded function information indicating said print output form includes information for the number of copies to be printed.

36. A facsimile communication system according to claim 32; wherein the expanded functional information indicating a print output form includes information concerning resolution.

37. A facsimile communication system according to claim 32; wherein the expanded functional information indicating a print output form includes information concerning a size of a print form.

38. A facsimile communication system comprising:
   a machine in a transmitting side connected to a communication line and executing facsimile transmission according to a specified communication protocol; and
   a machine in a receiving side connected to said communication line and receiving a facsimile message according to said specified communication protocol via said communication line from said machine in the transmitting side; wherein said machine in the transmitting side comprises:
      a first storing means for storing therein expanded functional information indicating a transmitting from of the machine, the expanded functional information including transmitting information including data of a color function, file information including data of a file size, and print information including data of a number of copies to be printed;
      a setting means for requesting transmission of the expanded functional information to said machine in the receiving side and setting the expanded functional information prior to when facsimile transmission is executed based on the expanded funtional information for said machine in the receiving side as a response to the request above and the expanded functional information stored in said first storing means; and
      a transmission control means for reporting the expanded functional information set by said setting means to said machine in the receiving side and controlling said facsimile transmission, and said machine in the receiving side comprises:
- a second storing means for storing therein expanded functional information indicating a receiving form including a file output form as well as a monochrome type of print output from for the machine;
- a data storing means for storing therein received data;
- a responding means for returning the expanded functional information stored in said second storing means to said machine in the transmitting means in response to a request from said machine in the transmitting means; and
- an output control means for receiving a facsimile message in a receiving form based on the expanded functional information reported from said machine in the transmitting side after said responding means returns a response and controlling the output operation; and also wherein said output control means stores received data from said machine in the transmitting side in said data storing means in a case were the file information and the print information of the expanded functional information for said machine in the transmitting side includes an instruction for a file output form or an instruction for a color type print output form.

39. A facsimile communication system according to claim 38; wherein the expanded functional information set by said setting means includes any of or a combination of a data rate of color data/monochrome data or gradation data or data for encoding system.

40. A facsimile communication system according to claim 38; wherein said specified communication protocol is a transfer sequence following recommendation for the ITU-T color facsimile standard.

41. A facsimile commumication system according to claim 38; wherein the expanded function information indicating said print output form includes information for the number of copies to be printed.

42. A facsimile communication system according to claim 38; wherein the expanded functional information indicating a print output form includes information concerning resolution.

43. A facsimile communication system according to claim 38; wherein the expanded function information indicating a print output form includes information concerning a size of a print form.

* * * * *